United States Patent
Sharma et al.

(10) Patent No.: US 12,039,066 B1
(45) Date of Patent: Jul. 16, 2024

(54) STORAGE AGNOSTIC LARGE SCALE PERMISSIONS AND ACCESS ANALYTICS

(71) Applicant: Egnyte, Inc., Mountain View, CA (US)

(72) Inventors: Shishir Sharma, Mountain View, CA (US); Amrit Jassal, Morgan Hill, CA (US); Sean Elliot Roberts, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 455 days.

(21) Appl. No.: 17/019,325

(22) Filed: Sep. 13, 2020

Related U.S. Application Data

(60) Provisional application No. 62/900,316, filed on Sep. 13, 2019.

(51) Int. Cl.
  *G06F 21/62* (2013.01)
  *G06F 21/31* (2013.01)
(52) U.S. Cl.
  CPC .......... *G06F 21/6218* (2013.01); *G06F 21/31* (2013.01); *G06F 2221/2113* (2013.01); *G06F 2221/2145* (2013.01)
(58) Field of Classification Search
  CPC .............................. G06F 21/628; G06F 21/31
  See application file for complete search history.

(56) References Cited

U.S. PATENT DOCUMENTS

| | | | |
|---|---|---|---|
| 9,223,789 B1 * | 12/2015 | Seigle | G06F 16/113 |
| 9,405,904 B1 * | 8/2016 | Fang | G06F 21/6272 |
| 9,961,155 B1 * | 5/2018 | Chan | H04L 61/50 |
| 10,713,226 B1 * | 7/2020 | Donohue | G06F 16/27 |
| 10,778,686 B2 * | 9/2020 | Palmer | G06F 16/9038 |
| 11,768,810 B2 * | 9/2023 | Jassal | G06F 16/182 707/785 |
| 2004/0249871 A1 * | 12/2004 | Bazoon | G06F 16/93 |

(Continued)

OTHER PUBLICATIONS

B. Tan, M. Biglari-Abhari and Z. Salcic, "A system-level security approach for heterogeneous MPSoCs," 2016 Conference on Design and Architectures for Signal and Image Processing (DASIP), Rennes, France, 2016, pp. 74-81. (Year: 2016).*

(Continued)

*Primary Examiner* — Kari L Schmidt
(74) *Attorney, Agent, or Firm* — Larry E. Henneman, Jr.; Henneman & Associates, PLC

(57) ABSTRACT

Systems and methods for simplifying and consolidating permission sets from multiple heterogeneous file storage systems are disclosed. An example method includes acquiring from the first file storage system a first set of file system permissions having a first set of permission semantics, and acquiring from a second file storage system a second set of file system permissions having a second set of permission semantics that are different from the first set of permission semantics. The first set of file system permissions and the second set of file system permissions are converted to a unified set of file system permissions having unified permission semantics that are different from the first set of permission semantics and the second set of permission semantics. The unified set of file system permissions can be analyzed to make a determination regarding security levels of the first file storage system and of the second file storage system.

20 Claims, 21 Drawing Sheets

(56) References Cited

U.S. PATENT DOCUMENTS

| | | | |
|---|---|---|---|
| 2005/0015674 A1* | 1/2005 | Haugh | G06F 21/6236 714/38.1 |
| 2005/0246762 A1* | 11/2005 | Girouard | H04L 63/104 726/2 |
| 2006/0010150 A1* | 1/2006 | Shaath | G06F 16/125 707/999.102 |
| 2006/0047689 A1* | 3/2006 | Gabbert | G06Q 50/18 707/999.102 |
| 2006/0048224 A1* | 3/2006 | Duncan | G06F 21/6218 726/22 |
| 2006/0090208 A1* | 4/2006 | Smith | H04L 63/105 713/166 |
| 2006/0129627 A1* | 6/2006 | Phillips | H04L 63/10 709/200 |
| 2010/0241668 A1* | 9/2010 | Susanto | G06F 21/305 707/784 |
| 2012/0159579 A1* | 6/2012 | Pineau | H04L 63/101 726/4 |
| 2013/0110922 A1* | 5/2013 | Shih | G06Q 50/01 709/204 |
| 2014/0149461 A1* | 5/2014 | Wijayaratne | G06F 16/182 707/783 |
| 2014/0196104 A1* | 7/2014 | Chari | H04L 63/102 726/1 |
| 2016/0026717 A1* | 1/2016 | Kelsey | H04L 67/30 707/754 |
| 2016/0337356 A1* | 11/2016 | Simon | H04L 63/10 |
| 2017/0193021 A1* | 7/2017 | Deng | G06F 8/63 |
| 2017/0346830 A1* | 11/2017 | Goldfarb | H04L 67/01 |
| 2018/0191686 A1* | 7/2018 | Ghafourifar | H04L 9/14 |
| 2018/0302390 A1* | 10/2018 | Beecham | H04L 63/0281 |
| 2019/0294699 A1* | 9/2019 | Bastide | G06F 16/13 |
| 2020/0065397 A1* | 2/2020 | Goenka | G06F 16/1834 |

OTHER PUBLICATIONS

Jajodia, Sushil, et al. "Flexible support for multiple access control policies." ACM Transactions on Database Systems (TODS) 26.2 (2001): 214-260. (Year: 2001).*

* cited by examiner

| SOURCE PERMISSIONS | UNIFIED PERMISSIONS |
|---|---|
| READ | READ |
| EDIT | WRITE |
| EXECUTE | READ |
| MOVE | DELETE, WRITE |
| DELETE | DELETE |

652 { (left brace) 654 } (right brace)

650

STORAGE AGNOSTIC LARGE SCALE PERMISSIONS AND ACCESS ANALYTICS

RELATED APPLICATIONS

The present application claims the benefit of priority to U.S. Provisional Patent Application No. 62/900,416, filed Sep. 13, 2019 by at least one common inventor.

BACKGROUND OF THE INVENTION

Field of the Invention

This invention relates generally to cloud-based analytics and more particularly to permissions and access analytics for cloud-based systems. Even more particularly, this invention relates to systems and methods for collecting permissions data from a plurality of disparate source systems and performing data analytics based on the collected permissions.

Description of the Background Art

Cloud-based file storage systems are known. In these systems, a plurality of local file storage systems (each associated with a particular physical location) can be synchronized with a remote file storage system over the Internet. The remote file storage system is hosted at a remote location, or distributed across multiple remote locations. Cloud-based file storage systems provide remote data access and data security by maintaining copies of the local file systems and allowing authorized users to access them from remote locations.

The remote file storage system must also store permissions data corresponding to the local file systems. Different types of storage systems have permissions with differing semantics, and many storage system types allow multiple sets of permissions to be assigned to each object. Over prolonged use of these systems, large numbers of permissions can accumulate. Storing large numbers of permissions from multiple storage systems on a remote file storage system is computationally inefficient, costly, and potentially complicates data analytics.

SUMMARY

The present invention overcomes the problems associated with the prior art, by providing systems and methods for simplifying and consolidating permission sets from multiple heterogeneous file storage systems. The present invention allows for data analytics to be performed on permissions sets across multiple disparate file storage systems each having distinct permissions semantics.

Methods for storing and/or using file system permissions are performed in a centralized file storage system. An example method includes establishing a first data connection with a first file storage system and acquiring from the first file storage system a first set of file system permissions. The first set of file system permissions has a first set of permission semantics, and the first set of file system permissions control access to at least one data object stored on the first file storage system by a first user associated with the first file storage system. The method additionally includes establishing a second data connection with a second file storage system and acquiring from the second file storage system a second set of file system permissions. The second set of file system permissions has a second set of permission semantics that are different from the first set of permission semantics.

In an example method, the first data connection can be a wide area network connection, and the second data connection can be a wide area network connection. The second set of file system permissions controls access to at least one data object stored on the second file storage system by a second user associated with the second file storage system. The method additionally includes converting the first set of file system permissions and the second set of file system permissions to a unified set of file system permissions. The unified set of file system permissions has unified permission semantics that are different from the first set of permission semantics and the second set of permission semantics. The example method additionally includes storing the unified set of file system permissions in memory of the centralized file storage system. The example method can further include analyzing the unified set of file system permissions to make a determination regarding a security level of the first file storage system and a security level of the second file storage system.

In a particular example method, the step of converting the first set of file system permissions and the second set of file system permissions to a unified set of file system permissions can include mapping the first set of file system permissions from the first set of permission semantics to the unified permission semantics. The method can also include mapping the second set of file system permissions from the second set of permission semantics to the unified permission semantics. The step of converting the first set of file system permissions and the second set of file system permissions to a unified set of file system permissions can also include defining inherited permissions for at least a portion of the unified set of file system permissions. The inherited permissions can indicate that the first user is granted equivalent access to a plurality of data objects of the first file storage system without specifying the equivalent access with individual permissions corresponding to each data object of the plurality of data objects. The step of converting the first set of file system permissions and the second set of file system permissions to a unified set of file system permissions can also include specifying permissions for file system objects of the portion of the unified set of file system permissions only if the specified permissions differ from the inherited permissions.

In the example methods, the step of converting the first set of file system permissions and the second set of file system permissions to a unified set of file system permissions can also include reorganizing the first set of file system permissions and the second set of file system permissions as user-level permissions. The step of reorganizing the first set of file system permissions and the second set of file system permissions as user-level permissions can also include retrieving directory data from a directory service associated with the first file storage system and the second file storage system.

In example methods, the step of analyzing the unified set of file system permissions can include determining if the first user and the second user have access to a particular subset of file system objects stored on the first file storage system and the second file storage system, and generating a group definition including the first user and the second user if the first user and the second user have access to the particular subset of file system objects. The step of analyzing the unified set of file system permissions can also (or alternatively) include determining a number of the unified permissions corresponding to the first file storage system that allow users of the first file storage system to perform a corresponding action on a corresponding file system object and determining a risk level of the first file storage system based at least in part on the number. The step of analyzing the unified set of file system permissions can also (or alternatively) include identifying file system objects of the first file storage system having no corresponding permissions that allow users of the first file storage system to perform a corresponding action on a corresponding one of the file system objects and archiving identified file system objects. The step of analyzing the unified set of file system permissions can also (or alternatively) include determining a number of the unified permissions that allow the first user to perform a corresponding action on a corresponding file system object and determining a risk level of the first user based at least in part on the number.

Example methods can also include receiving data indicative of users accessing data objects of the first file storage system and the second file storage system and determining that the first user does not access the second file storage system based on the received data. The example methods can then also include altering the second set of file system permissions to disallow the first user from performing actions on file system objects of the second file storage system if the second set of file system permissions allows the first user to perform actions on file system objects of the second file storage system.

Example methods can further include receiving data indicative of users accessing data objects of the first file storage system and the second file storage system and determining from the data a first number indicative of how often the users access data objects of the first file storage system and determining from the data a second number indicative of how often the users access data objects of the second file storage system. The example methods can additionally include determining whether the users access the first file storage system more often than the second file storage system. In the example methods, the step of analyzing the unified set of file system permissions can include determining a third number of the unified permissions corresponding to the first file storage system that allow users of the first file storage system to perform a corresponding action on a corresponding file system object. The step of analyzing the unified set of file system permissions can also include determining a fourth number of the unified permissions corresponding to the second file storage system that allow users of the second file storage system to perform a corresponding action on a corresponding file system object. Then, the step of determining whether the users access the first file storage system more often than the second file storage system includes determining whether the first number divided by the third number is larger than the second number divided by the fourth number.

Example methods can also include updating the unified set of file system permissions periodically. In the example methods, the step of analyzing the unified set of file system permissions can include determining that the first user has a first threat level and determining that the second user has a second threat level. The first threat level can be based at least in part on a number of the unified permissions allowing the first user to perform an associated action on an associated data object of the first file storage system or the second file storage system. The second threat level can be based at least in part on a number of the unified permissions allowing the second user to perform an associated action on an associated data object of the first file storage system or the second file storage system. In an example method, the second threat level indicates a greater threat than the first threat level. So, the step of updating the unified set of file system permissions periodically includes updating permissions corresponding to the first user at a first frequency, and the step of updating the unified set of file system permissions periodically includes updating permissions corresponding to the second user at a second frequency, the second frequency being higher than the first frequency.

In an example method, the unified set of file system permissions can include only READ, WRITE, and DELETE permissions. As another option, the unified set of file system permissions include no more than three distinct permissions.

An example method can additionally include synchronizing files stored in the centralized file storage system with files stored on the first file storage system using file system events received from the first file storage system. The example method can also include synchronizing files stored on the centralized file storage system with files stored on the second file storage system using file system events received from the second file storage system. Then, the example method can include using the file system events received from the first and second file storage systems in conjunction with the unified permissions to evaluate the security of the first file storage system and the second file storage system. The example method can additionally include communicating instructions that cause the first file storage system to modify the first set of file system permissions based on the evaluation of the security of the first file storage system and the second file storage system.

File storage systems are also disclosed. An example file storage system includes one or more processing units, memory, and a communication interface. The memory can store data and code, and the code can include a set of predefined instructions that, when executed by the processing unit(s) cause the file storage system to perform corresponding actions. The corresponding actions can include any of the methods disclosed herein.

In an example system, a first subset of the set of predefined instructions can cause the file storage system to establish a first connection with a first remote file storage system via the communication interface. A second subset of the set of predefined instructions can cause the file storage system to acquire from the first remote file storage system a first set of file system permissions having a first set of permission semantics. The first set of file system permissions can control data access to at least one data object stored on the first remote file storage system by a first user associated with the first remote file storage system. A third subset of the set of predefined instructions can cause the file storage system to establish a second connection with a second remote file storage system via the communication interface. A fourth subset of the set of predefined instructions can cause the file storage system to acquiring from the second remote file storage system a second set of file system permissions having a second set of permission semantics different from the first set of permission semantics. The second set of file system permissions can control access to at least one data object stored on the second remote file storage system by a second user associated with the second remote file storage system. A fifth subset of the set of predefined instructions can cause the file storage system to convert the first set of file system permissions and the second set of file system permissions to a unified set of file system permissions having unified permission semantics that are different from the first set of permission semantics and the second set of permission semantics. A sixth subset of the set of predefined instructions can cause the file storage system to store the unified set of file system permissions in the memory, and a seventh subset of the set of predefined instructions can cause the file storage system to determine the security of the first remote file storage system and the second remote file storage system based on the unified set of file system permissions.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a cloud-based system for simplifying and consolidating permission sets from multiple heterogeneous file storage systems. The present invention allows for data analytics to be performed on permissions sets across multiple disparate file storage systems each having distinct permissions semantics. In the following description, numerous specific details are set forth (e.g., particular permissions types, data structures, etc.) in order to provide a thorough understanding of the invention. Those skilled in the art will recognize, however, that the invention may be practiced apart from these specific details. In other instances, details of well-known cloud-computing practices (e.g., file/object handling and storage) and components have been omitted, so as not to unnecessarily obscure the present invention.

Figure 1:
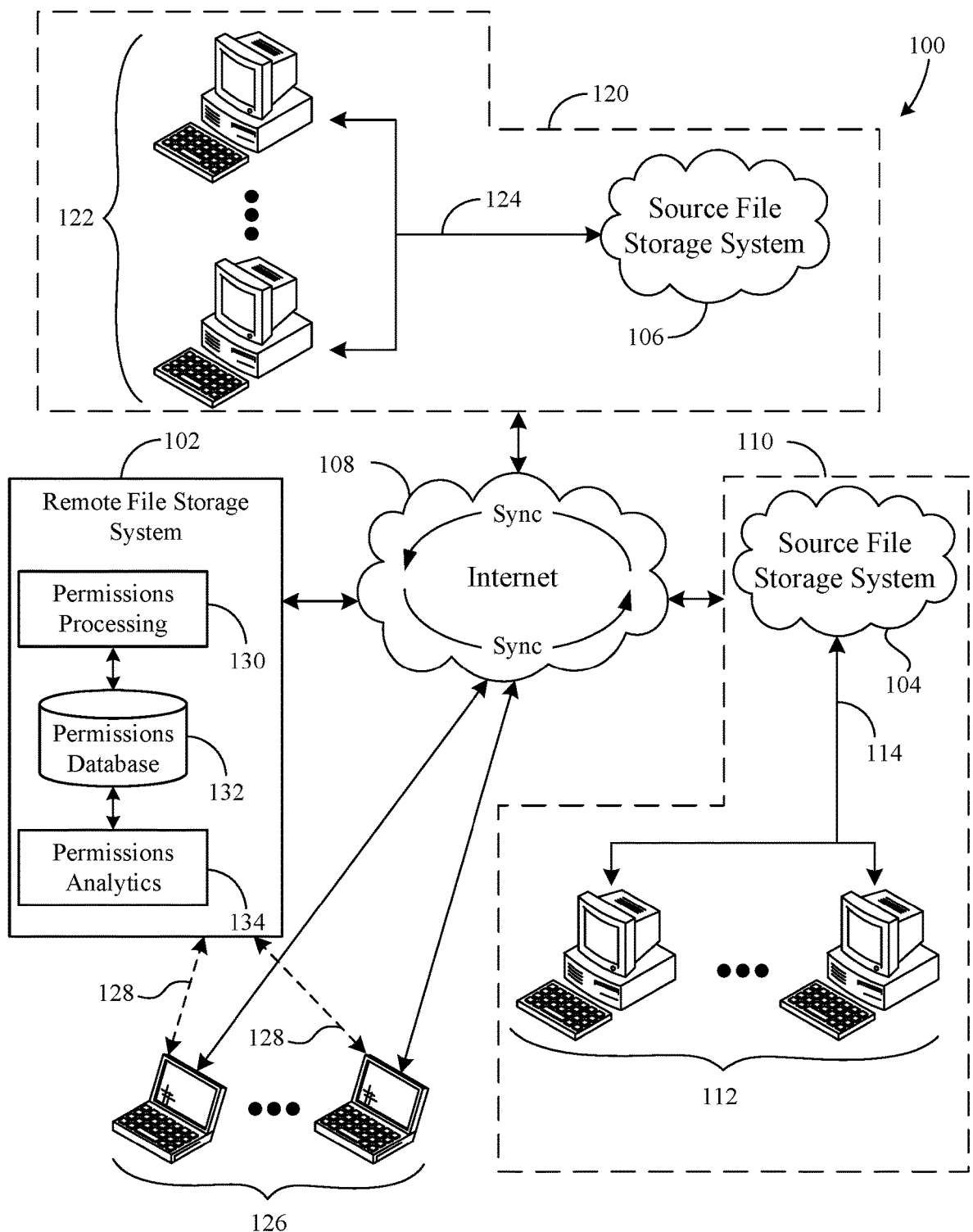
FIG. 1 is a block diagram showing an example cloud-based computing system.

FIG. 1 shows a cloud computing system 100 that includes a remote file storage system 102, a source file storage system 104, and another source file storage system 106, which communicate and are synchronized via an internetwork (e.g., the Internet 108). Source file storage system 104 can be hosted, for example, by a file server at the headquarters (HQ) 110 of a company. A local file system (e.g., a namespace and corresponding file data) stored on source file storage system 104 is synchronized with remote file storage system 102 to provide local and remote data access and remote data security. In this embodiment, at least a portion of the local file system stored on source file storage system 104 is bi-directionally synchronized with remote file storage system 102, although one-way synchronization of all or portions of the local and remote file systems is also possible. Local users of the company can access local file system objects stored on source file storage system 104 via local clients 112, which are devices in communication with source file storage system 104 via a local area network 114. Optionally, source file storage system 104 can extend access for local clients 112 to the customer's remote file system stored on remote file storage system 102 via Internet 108.

Source file storage system 106 can be located, for example, at a regional branch 120 that is remote to both headquarters 110 and remote file storage system 102. Source file storage system 106 also provides local file system access to its own local clients 122 at branch 120, where its local file system can also be synchronized with remote file storage system 102. Thus, in the example shown in FIG. 1, the company has two local file systems stored on respective source file storage systems 104 and 106. However, it will be understood that the company can have any number of local file systems stored across any number of local cloud devices (e.g., across many different branches/offices) that are geographically remote from each other and remote file storage system 102.

Each of source file storage system 104 and source file storage system 106 include directory services that function as a single point from which local users can locate certain resources and services distributed throughout local network 114 and local network 124, respectively. The directory services maintain a plurality of source permissions that control access to digital objects stored on source file storage systems 104 and 106 by local users. Alternatively, the source permissions can be stored along with the digital objects they govern. The source permissions are typically defined on an object-by-object basis, for example in access control lists (ACLs) associated with individual objects. In addition, the directory services maintain a plurality of user accounts, including authentication information, assigned groups, etc. The source permissions can optionally be defined with respect to assigned users and/or groups. Additionally, the directory service may provide one or more users with root-level permission (e.g. a Unix power user) over the entire system for administrative purposes.

Remote file storage system 102 maintains a remote (cloud) file system associated with the company. The remote file system includes portions that are synchronized with the local file system stored on source file storage system 104 and the local file system stored on source file storage system 106, as well as an optional cloud-only file system. Remote users of the company can access its remote file system via remote client devices 126 over Internet 108 or via some other connection 128 with remote file storage system 102.

In addition to providing file system storage and synchronization, remote file storage system 102 consolidates and performs analytics on the source permissions from source file storage systems 104 and 106. Source permissions are received, processed, and consolidated by a permissions processing layer 130, which then stores the consolidated permissions in a permissions database 132. A permissions analytics layer 134 accesses the consolidated permissions stored in database 132 in order to perform data analytics. The data analytics provide useful information to the company regarding data availability, data access, user behavior, risk levels, etc.

"Permissions", as referred to herein, are access rights associated with a particular user or group of users and define the users' ability to access, edit, execute, or otherwise interact with a particular file system object (or any file system object within a particular directory) stored on any of remote file storage system 102, source file storage system 104, and/or source file storage system 106. In the context of the present application, "permissions" can also refer to the digital, software, or data entities that enforce the access rights on a file system, including any file attributes that allow selective access on a user-by-user basis.

It should also be noted that the company associated with source file storage systems 104 and 106 will be described herein as a "subscriber" or a "customer" of a cloud service provider operating remote file storage system 102. Accordingly, it will be understood that remote file storage system 102 is a multi-tenant storage system and, therefore, can store and synchronize file systems associated with many other customers as well, for example, on a subscription basis. Additionally, the terms "subscriber" and "customer" should be thought of expansively to include any entity that uses the cloud services described herein, whether or not something of value (e.g., money) is exchanged for those cloud services. Alternatively, the cloud service provider may be an IT division of the company associated with source file storage systems 104 and 106.

Figure 2:
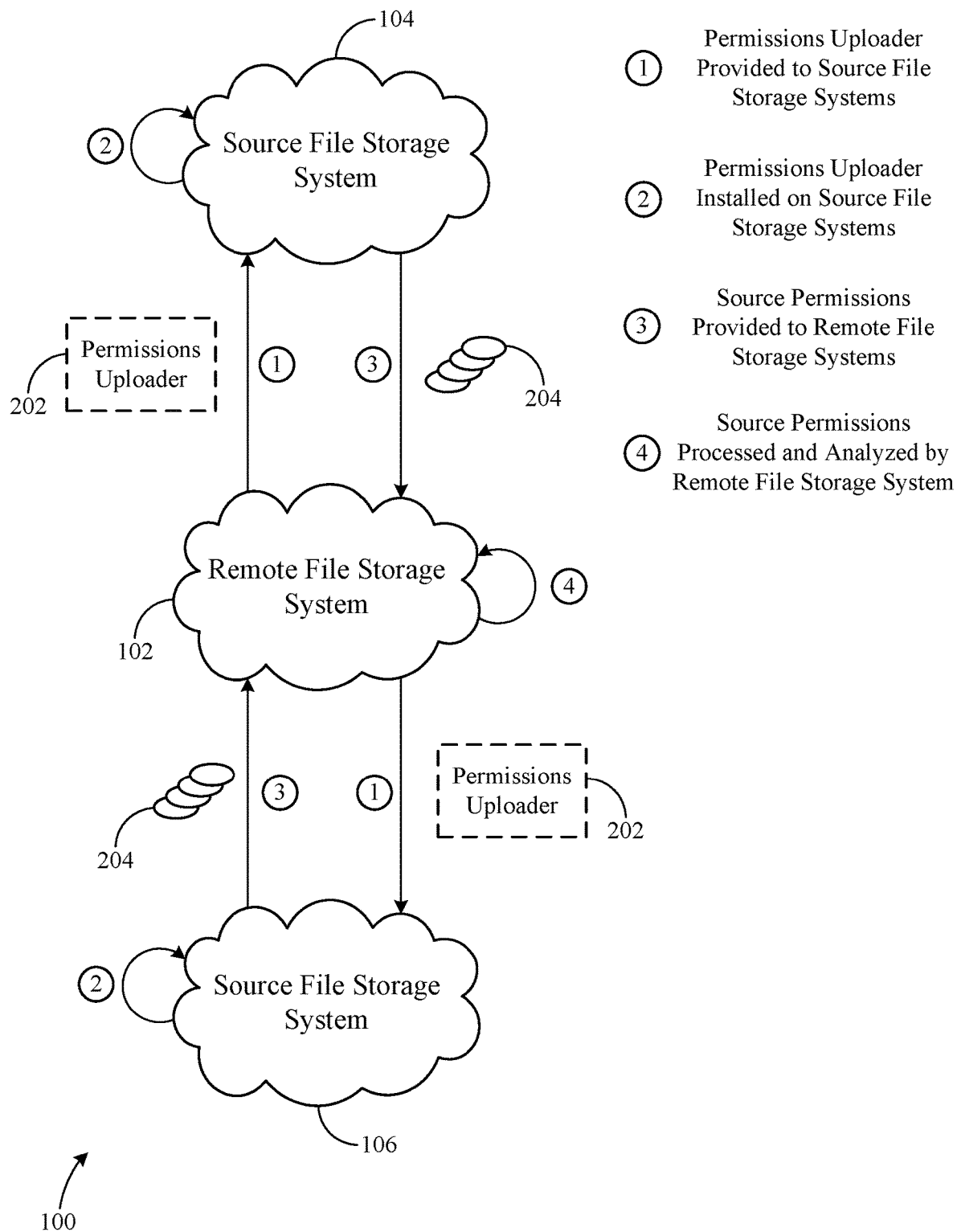
FIG. 2 is a diagram showing a process for uploading permissions from multiple source file storage systems to an example remote file storage system of FIG. 1.

FIG. 2 is a diagram showing an example flow of source permissions information between source file storage systems 104 and 106 and remote file storage system 102. At (1), a permissions uploader 202 is provided to source file storage systems 104 and 106 from remote file storage system 102, through an Internet-mediated connection, such as a Web Socket connection. Then, at (2) the permissions uploader is installed on source file storage systems 104 and 106. Permissions uploader 202 includes software that scans source file storage systems 104 and 106 for permissions data and packages/formats the data to be provided to remote file storage system 102. By way f non-limiting example, the permissions data on source file storage systems 104 and 106 may exist in the form of any or all of separate permissions files, file/folder attributes, file metadata, etc. Permissions uploader 202 collects the permissions data of each form and packages it, while maintaining system-specific semantics (e.g. "EDIT" vs "WRITE") of the source permissions. Next, at (3) the permissions uploader provides the source permissions 204 of source file storage systems 104 and 106 to remote file storage system 102. Finally, at (4) the source permissions are processed and analyzed by remote file storage system 102. Then, in conjunction with a stream of access events from source file storage systems 104 and 106, the processed permissions information can be used to efficiently generate information indicative of the permissions and access trends with respect to objects and users on source file storage systems 104 and 106, and thereby used by the cloud customer to discover security threats and address them.

Figure 3:
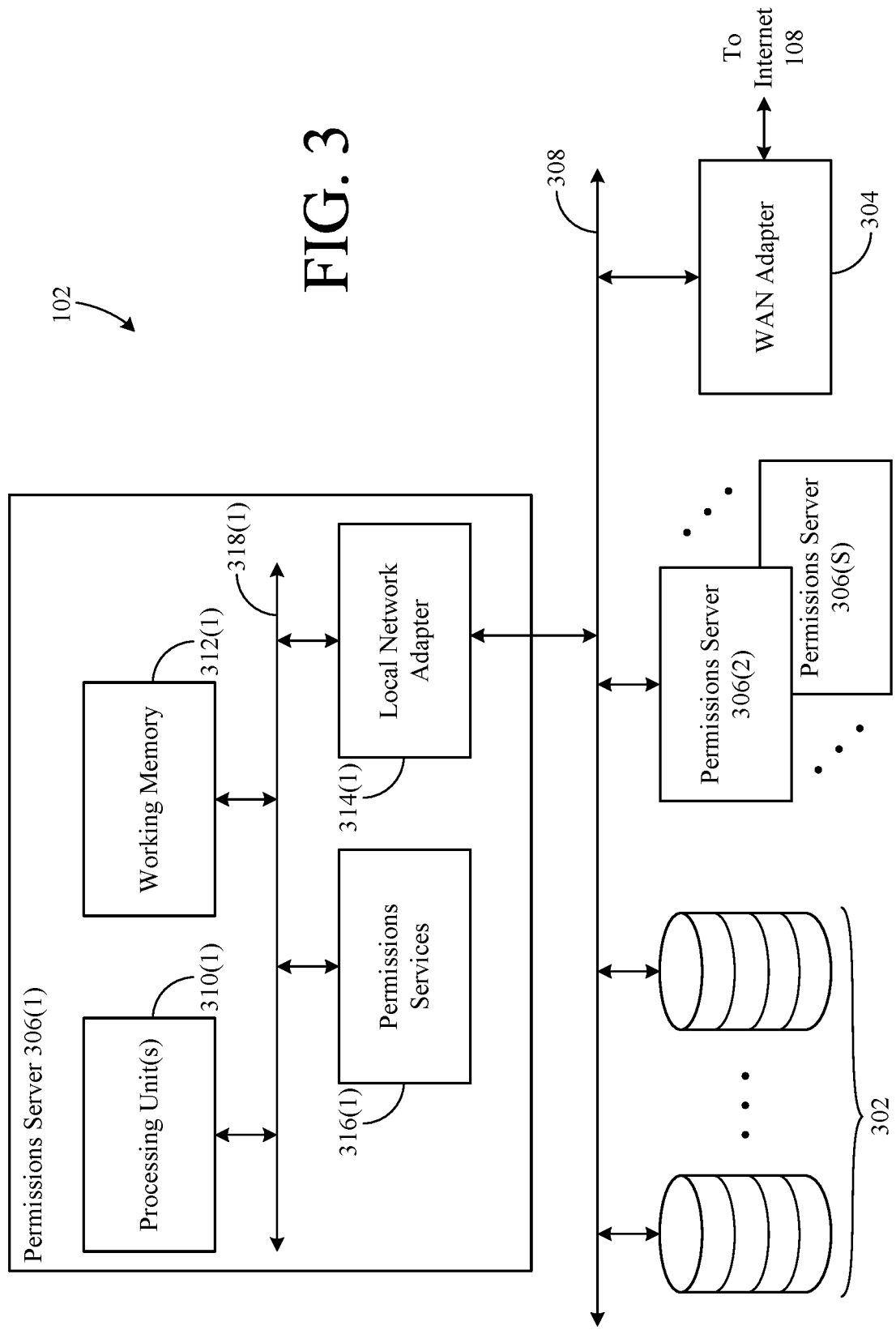
FIG. 3 is a block diagram showing the example remote file storage system of FIG. 1 in more detail.

FIG. 3 is a block diagram showing remote file storage system 102 in more detail. Remote file storage system 102 is a cloud-based computer system including multi-tenant data storage devices 302, a WAN adapter 304, and permissions servers 306(1-S), all interconnected via a local network 308. Storage devices 302 can be network attached storage devices for storing data associated with multiple different cloud subscribers. The cloud subscribers (or customers, clients, users, etc.) can be separate, unaffiliated entities, such as corporations, government offices, individuals, etc. Storage devices 302 can also provide non-volatile data storage utilized by every other component of remote file storage system 102, including the storage of data objects, permissions, system settings, applications, etc. WAN adapter 304 is a network adapter for establishing a connection to the Internet 108. Elements of remote file storage system 102 utilize WAN adapter 304 to communicate with remote systems, such as local file storage systems 104 and 106, client machines 126, and any other systems authorized to communicate with remote file storage system 102 (e.g., to utilize the permissions services).

The example cloud-based system provides significant advantages over prior art systems, such as enterprise systems, distributed file systems, etc. For example, the permissions analytics services of the present invention can be provided to small entities at much less expense by utilizing the immense computing resources provided and maintained by the cloud service provider. In contrast, an enterprise system is very costly to set up and, therefore, is used predominantly by multi-national corporations or other similarly sized entities. Notwithstanding the advantages provided above, the cloud-based implementation described is not an essential element of the present invention. Indeed, various embodiments of the present invention can be useful in any computing system that uses permissions to control access to resources.

Permissions servers 306 provide the described permissions services for local file storage systems and cloud-based storage servers associated with various cloud clients. In the example embodiment, permissions server 306(1) provides permissions services for local file storage system 104 and 106. Permissions server 306(1) includes one or more processing units 310(1), working memory 312(1), a local network adapter 314(1), and a permissions services module 316(1), all interconnected via an internal bus 318(1). Processing unit(s) 310(1) execute code transferred into working memory 312(1) from, for example, storage devices 302, to impart functionality to various components of permissions server 306(1). Working memory 312(1) can also cache frequently used code, such as network locations of storage devices 302, to be quickly accessed by the various components of permissions server 302(1). Local network adapter 314(1) provides a network connection between permissions server 306(1) and local network 308 and, therefore, WAN adapter 304, which provides a connection to the Internet

108. Permissions services 316(1) are various software services, running within working memory 312(1), for collecting, consolidating, reorganizing, and analyzing the permissions retrieved from local file storage systems 104 and 106. Permissions services 316(1) perform data analytics on events received from local file storage systems 104 and 106 and the user-level, consolidated permissions derived from the permissions received from local file storage systems 104 and 106.

Although only permissions server 306(1) is shown in detail, it should be understood that permissions server 306(1) is substantially similar to permissions servers 306(2-S), except that any of permissions servers 306 can correspond to different cloud clients and, therefore, can be configured differently to utilize different data, permissions, applications, network connections, etc. This is another advantage of this particular example embodiment. The cloud services provided by remote file storage system 102 can be customized to suit the needs of many greatly disparate customers efficiently and effectively through the utilization of the various servers. For example, through the use of a single hardware server and virtual machines installed thereon, a plurality of small entities can be served by default and/or mirrored settings at minimal cost. Similarly, many hardware servers could be used (with or without virtual machines) to provide service to a single large entity with highly particular settings, different settings for different directories, etc. Indeed, a great advantage of the described cloud system is the flexibility available in providing service to a wide variety of different subscribers.

Figure 4:
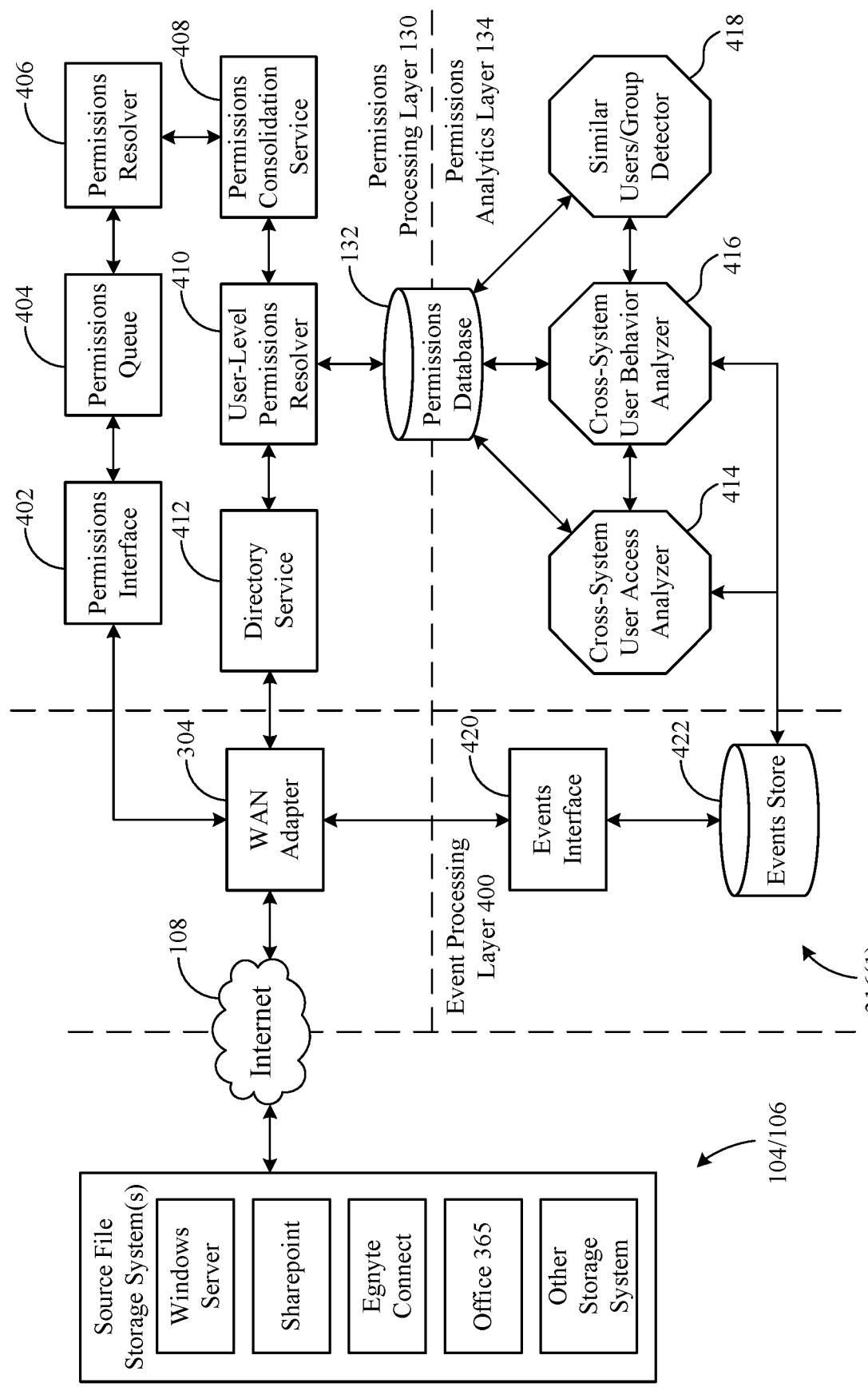
FIG. 4 is a block diagram showing example permissions services of FIG. 3 in more detail.

FIG. 4 is a block diagram showing the organization of aspects of remote file storage system 102 in greater detail, including permissions processing layer 130, permissions database 132, and permissions analytics layer 134 of permissions services 316(1). Permissions processing layer 130 receives permissions from the disparate source systems and performs various mappings, transformations, reductions, etc. on the received permissions to convert them into unified (i.e., having common semantics), user-level permissions. Permissions database 132 stores the unified, user-level permissions to be accessed by permissions analytics layer 134. Together with an event processing layer 400, which receives and processes data access and modifications events from the source file storage systems, permissions analytics layer 134 performs data analytics and other analysis on the permissions and the events in order to identify vulnerable datasets, risky users, anomalous access patterns, etc.

Permissions processing layer 130 includes a permissions interface 402, which receives source permissions from source file storage systems 104 and/or 106, via the Internet 108 and WAN adapter 304. Permissions interface 402 removes headers (e.g. WebSocket headers), trailers, or any other data used to send the source permissions over the Internet 108, before storing the source permissions in a permissions queue 404. Permissions queue 404 is, for example, a first-in, first-out (FIFO) data buffer. In the example embodiment, permissions queue 404 facilitates sequential processing of permissions received from the source systems in order to, for example, process permissions based on a priority level determined by the source systems or permissions uploader 202, based, for example, on the number of open permissions associated with an object, a user, etc.

Figure 6A:
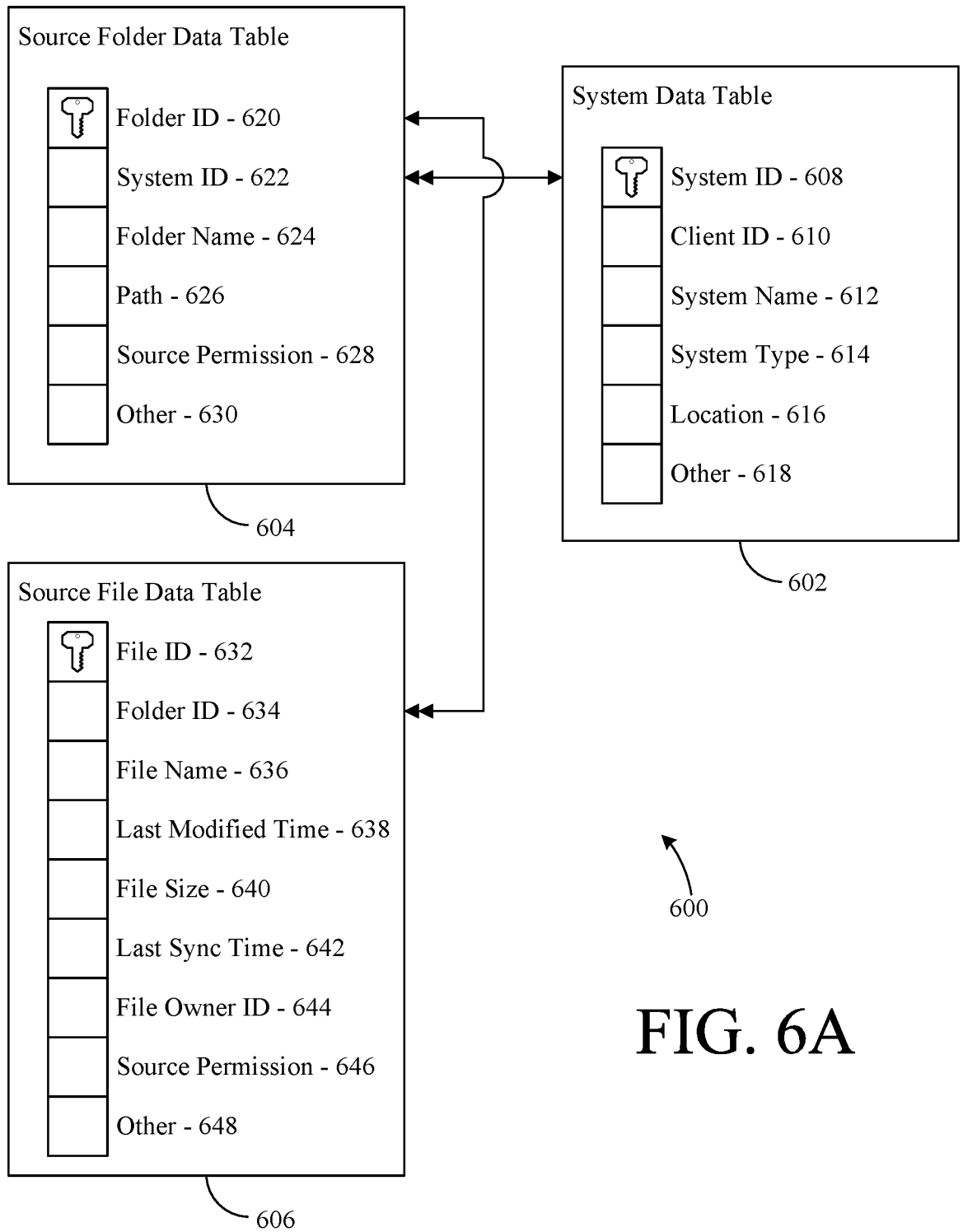
FIG. 6A shows an example data structure for associating data indicative of object-based permissions from the source file storage systems of FIG. 1.
Figure 6B:
FIG. 6B is a chart showing a mapping between example source permissions and unified permissions utilized by the remote file storage system of FIG. 1.

A permissions resolver 406 reads source permissions from permissions queue 404 and converts them from storage system specific permissions (e.g. Microsoft ACLs, Unix permissions, etc.) into generic permissions (e.g. Read, Write, Delete permissions), according to a plurality of permissions maps (an example of one such permissions map is shown in FIG. 6B) stored thereon. The permissions maps include mappings between equivalent permissions (e.g, Remove to Delete), from compound permissions to combinations of simple permissions (e.g., Move to Delete/Write), etc. The permissions maps can also take into account file flags and/or attributes, such as the "immutable" flag, which indicates that no users have permission to write or delete the implicated file or directory. Permissions resolver 406 selects one of the plurality of permissions maps for converting the permissions, based on the type of storage system the permissions originated from. This information can be predefined or determined from the permissions themselves. For example, the permissions can be "marked" with a particular system type, or permissions resolver 406 can detect the system type based on the source permissions semantics. Alternatively, the functionality of permissions resolver 406 can be provided by permissions uploader 202 before the permissions are uploaded to remote file storage system 102.

The exact permissions maps used by permissions resolver 406 are not absolute for a given source system. Rather, different permissions mapping may be preferred for different applications. For example, one cloud service provider may decide to ignore file flags and attributes, while another may decide to reflect them in the simplified permissions, e.g., by altering the resultant simplified permissions in a predefined way based on the effects of the relevant flags/attributes. Two separate source systems associated with the same cloud service provider may even have different mappings despite sharing common permissions semantics, if there is sufficient reason to treat the two source systems differently.

Once the source permissions are converted to generic permissions sets, permissions resolver 406 provides them to a permissions consolidation service 408. Permissions consolidation service 408 performs a reduction on the permissions sets to convert them into inheritance-based, sparse datasets, before providing the datasets to a user-level permissions resolver 410. In other words, permissions consolidation service 408 replaces the object-level permissions with inherited permissions, and only provides additional data indicative of the particular permissions that differ from the inherited permissions. The sparse datasets are computation- and storage-efficient and allow for quick analysis of permissions data represented thereby.

User-level permissions resolver 410 converts the consolidated permissions from system-level or object-level (i.e., organized by the corresponding source file storage system or corresponding object, respectively) to user-level (organized by user) permissions sets, by utilizing directory data from a directory service 412. Directory service 412 contains user data for all the users with access to data objects on any of remote file storage system 102 and source file storage systems 104 and 106. User data for users on source file storage systems 104 and 106 can be uploaded from the source directories, extracted using specialized software, etc. User-level permissions resolver 410 then stores the user-level permission sets in permissions database 132. More information about cloud-based user directory data can be found in U.S. application Ser. No. 15/388,038, filed on Dec. 22, 2016 and entitled Event-Based User State Synchronization in a Cloud Storage System, which is incorporated herein by reference in its entirety.

In the example embodiment, the permissions stored in permissions database 132 are user-level, sparse permissions as generated by permissions processing layer 130. The inventors have found that this particular format for the permissions provides an improved view into the security of the source systems. However, in alternative embodiments, the permissions stored in permissions database 132 could have a differing structure depending, for example, on the needs of the particular cloud subscriber to whom the permissions correspond. For example, a particular cloud subscriber may not have interest in tracking the permissions at the user-level, if the users associated with that subscriber all have equal access to the monitored file systems. Other possible alternatives will be apparent to those having ordinary skill in the art, particularly in view of the present disclosure.

Permissions analytics layer 134 includes a cross-system user access analyzer 414, a cross-system user behavior analyzer 416, and a similar users/group detector 418. Analyzers 414 and 416 utilize permission sets from permissions database 132, as well as access/modification events received from source storage systems 104 and 106, to perform permission and access analytics on the permissions of source file storage systems 104 and 106. The events are indicative of data objects that have been accessed and/or modified on source file storage systems 104 and 106. The events are also indicative of the user that accessed and/or modified the corresponding data object and are, therefore, useful in performing analysis on permissions data. The events are obtained from event streams provided by source file storage systems 104 and 106 in order to synchronize file systems thereon with one or more file systems on remote cloud server 102. An events interface 420 receives events as they are generated by source file storage systems 104 and 106 or queries source file storage systems 104 and 106, via the Internet 108, for the events. The events can be queried based on particular attributes. For example, events created during a particular time period, pertaining to one or more particular user(s) or file system object(s), etc. can be requested. Events interface 420 removes any headers (e.g. REST API headers) pertaining to the particular protocol used to provide the events over the Internet 108 and stores the events in an events store 422, where they can be accessed by analyzers 414 and 416. More information about file system object access events can be found in U.S. application Ser. No. 13/958,298, filed on Aug. 2, 2013 and entitled System and Method for Event-Based Synchronization of Remote and Local File Systems, and U.S. application Ser. No. 13/958,435, filed on Aug. 2, 2013 and entitled System and Method for Event-Based Synchronization of Remote and Local File System, both of which are incorporated herein by reference in their respective entireties.

Cross-system user access analyzer 414 performs user access analysis across source file storage systems 104 and 106. For example, analyzer 416 discovers users within the organization that have access to large amounts of data and, thus, present a larger security risk than other users. The relative security risks of various users can then be utilized to determine how frequently permissions data should be recomputed. For example, low risk users can have their permissions data recomputed relatively infrequently, so that remote file storage system 102 can focus resources on riskier users and provide low latency access analysis at a larger scale. Analyzer 414 can also detect if certain storage systems have more open permissions than others or if certain storage systems have unreachable data. Storage systems with more open permissions present a higher risk to the organization. Data that cannot be accessed can be archived to free up storage and/or computational resources, or can have the permissions modified to make the data accessible.

Cross-system user behavior analyzer 416 performs user behavior analysis across source file storage systems 104 and 106. For example, analyzer 416 determines whether users access certain ones of source file storage systems 104 and 106 more than others, with respect to their access permissions. For example, analyzer 416 determines if a user accesses one storage system more than another, despite having equivalent access permissions for both. Analyzer 416 also determines which data sources users have access permissions for, yet do not access. For data security reasons, users can have restricted access permissions to data sources that they do not access.

Figure 5A:
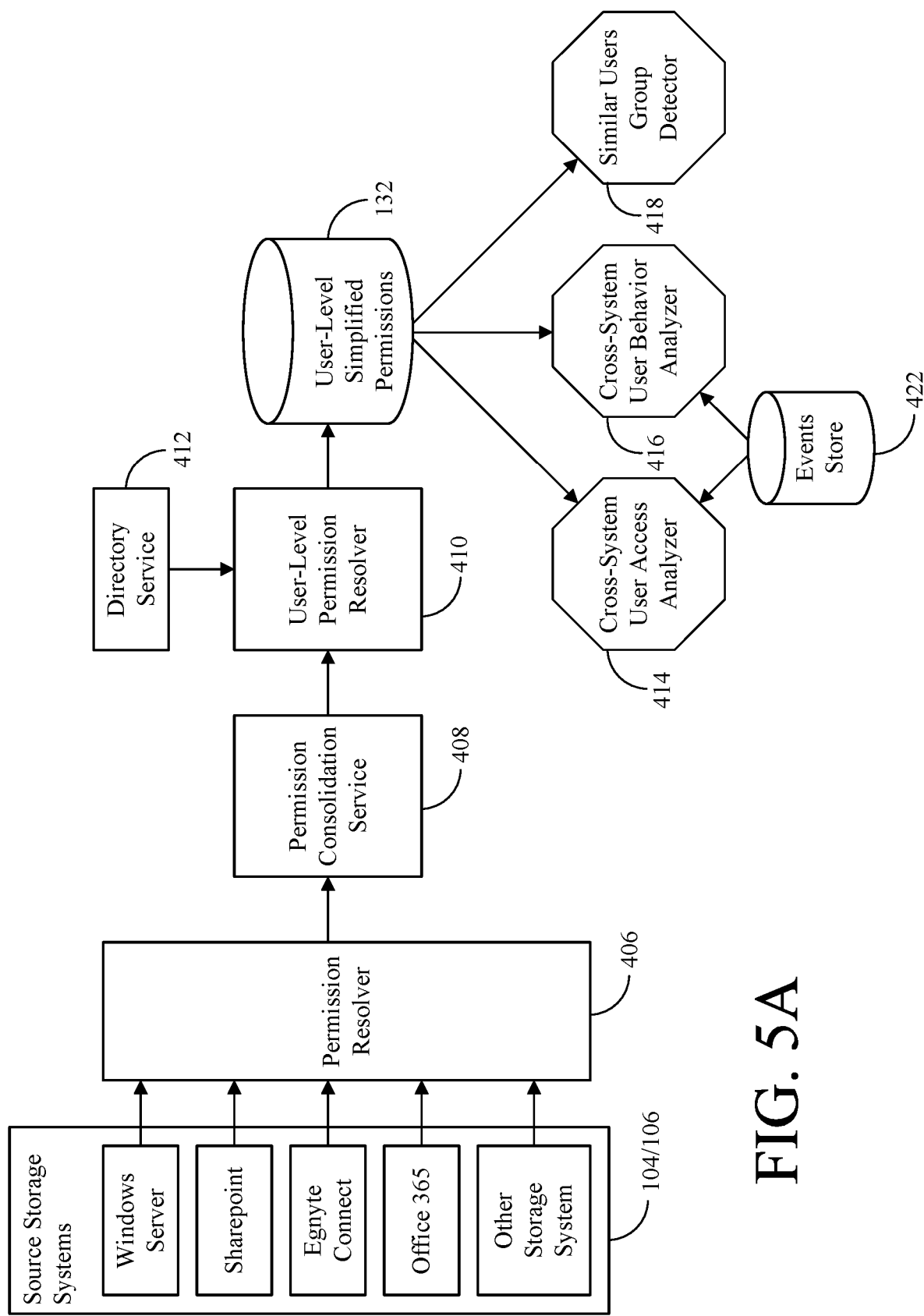
FIG. 5A is a data flow diagram illustrating data flow in an example embodiment.

Similar users/group detector 418 performs similarity analysis between permitted datasets on source file storage systems 104 and 106. Detector 418 finds collections of users that can be classified together based on common access permissions, in order to identify access trends related to common characteristics of the users in those collections. In this way, detector 418 can retroactively classify users into groups for subscribers that had previously neglected the group functionality on their source systems. Similarly, detector 418 can find groups/roles that have similar access permissions and classify them together. For example, a research and development group may have the same access as an intellectual property group to a particular file system. In that case, detector 418 would classify the research and development group and the intellectual property group as a unit. In addition, detector 418 can also identify similar groups that should be treated differently. For example, if the above research and development group predominantly writes a portion of the files on the associated system, while the intellectual property group predominantly reads files on the system, detector 418 can determine that the intellectual property group should have read-only permissions on much, if not all, of the system. FIG. 5A is a data flow diagram for an example embodiment of the present invention. Example methods will be described with reference to FIG. 5A, as well as FIGS. 5B-5E, which are flow charts summarizing example methods performed by the components of FIG. 5A.

Figure 5B:
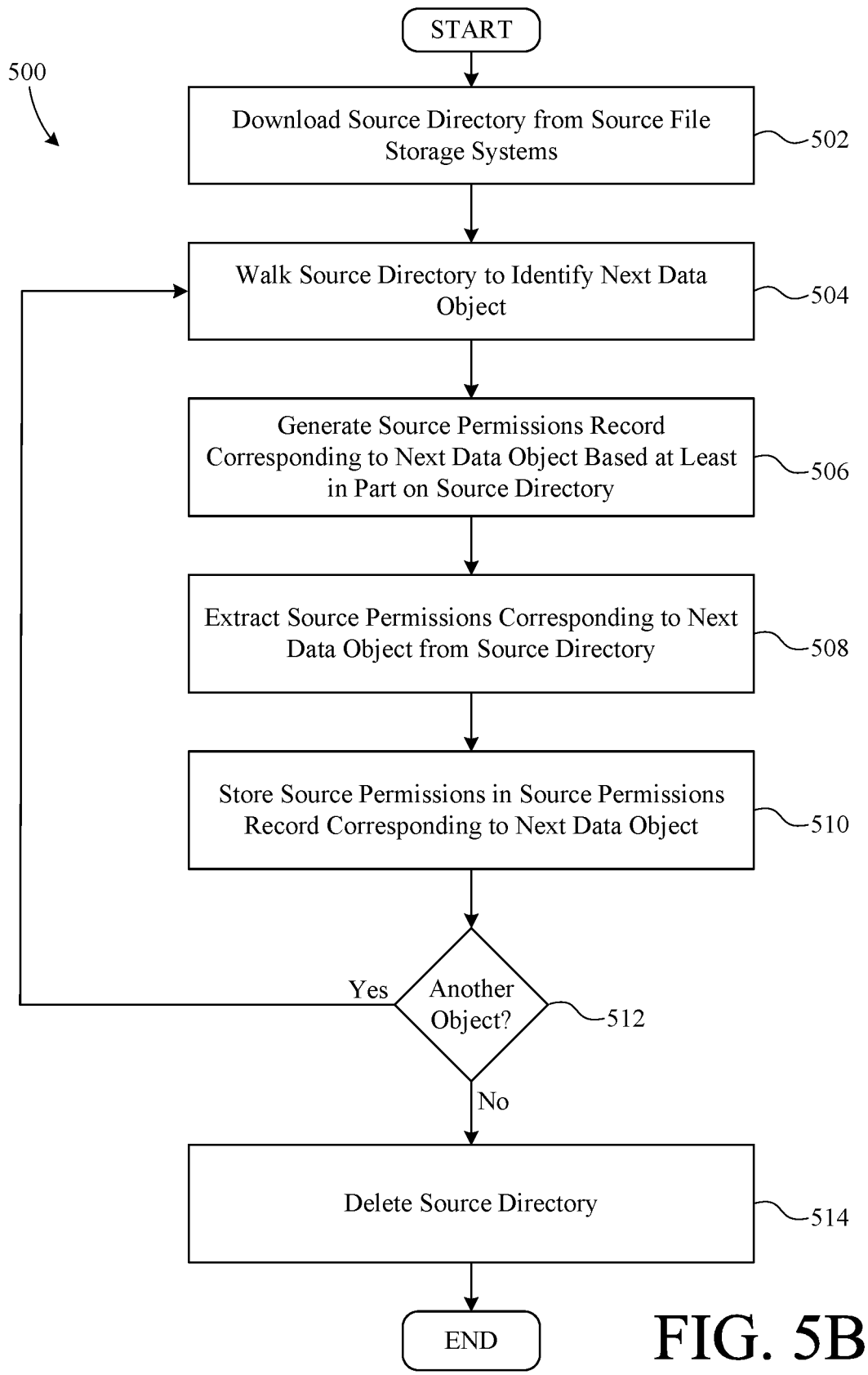
FIG. 5B is a flow chart summarizing an example method for ingesting source permissions from source storage systems.

FIG. 5B summarizes an example method 500 for ingesting source permissions from source storage systems 104 and/or 106, which provide object-based permissions datasets in their entirety to permissions resolver 406. In a first step 502, the source directory (i.e. the directory tree containing metadata corresponding to all of the folders and files of the source system) is downloaded from the source file storage system (e.g. over the Internet 108). In a second step 504, the source directory is walked to identify the next data object (starting, for example, with the root directory folder). Then, in a third step 506, a source permissions record (shown in FIG. 6A) corresponding to the next data object is generated based at least in part on the source directory. Next, in a fourth step 508, source permissions corresponding to the next data object are extracted from the source directory. Then, in a fifth step 510, the extracted source permissions are stored in the source permissions record corresponding to the next data object. Then, at a decision block 512, it is determined whether or not there are additional objects identified by the source directory. If there is an additional object, the method returns to step 504, where a new next data object is identified. Steps 506-510 repeat for each identified data object. In this way, the permissions for each data object are stored in a separate source permissions record stored in association with the corresponding data object. If, in decision block 512, it is determined that there is not another data object, then method 500 proceeds to step 514, where the source directory is deleted. Then method 500 ends. Optionally, the source directory could be archived and/or stored in storage devices 302, for example.

Method 500 is utilized to traverse the entire directory of the source file storage system and extract all permissions data. The method starts with the root folder, extracts permissions of the root folder, then continues to every object in the root folder (including other folders), then to every object in the folders of the root folder, and so on. The steps of method 500 are performed, for example, by permissions resolver 406. In alternative embodiments, some or all of the steps of method 500 could be performed by an upload service installed on the source system(s).

Figure 6C:
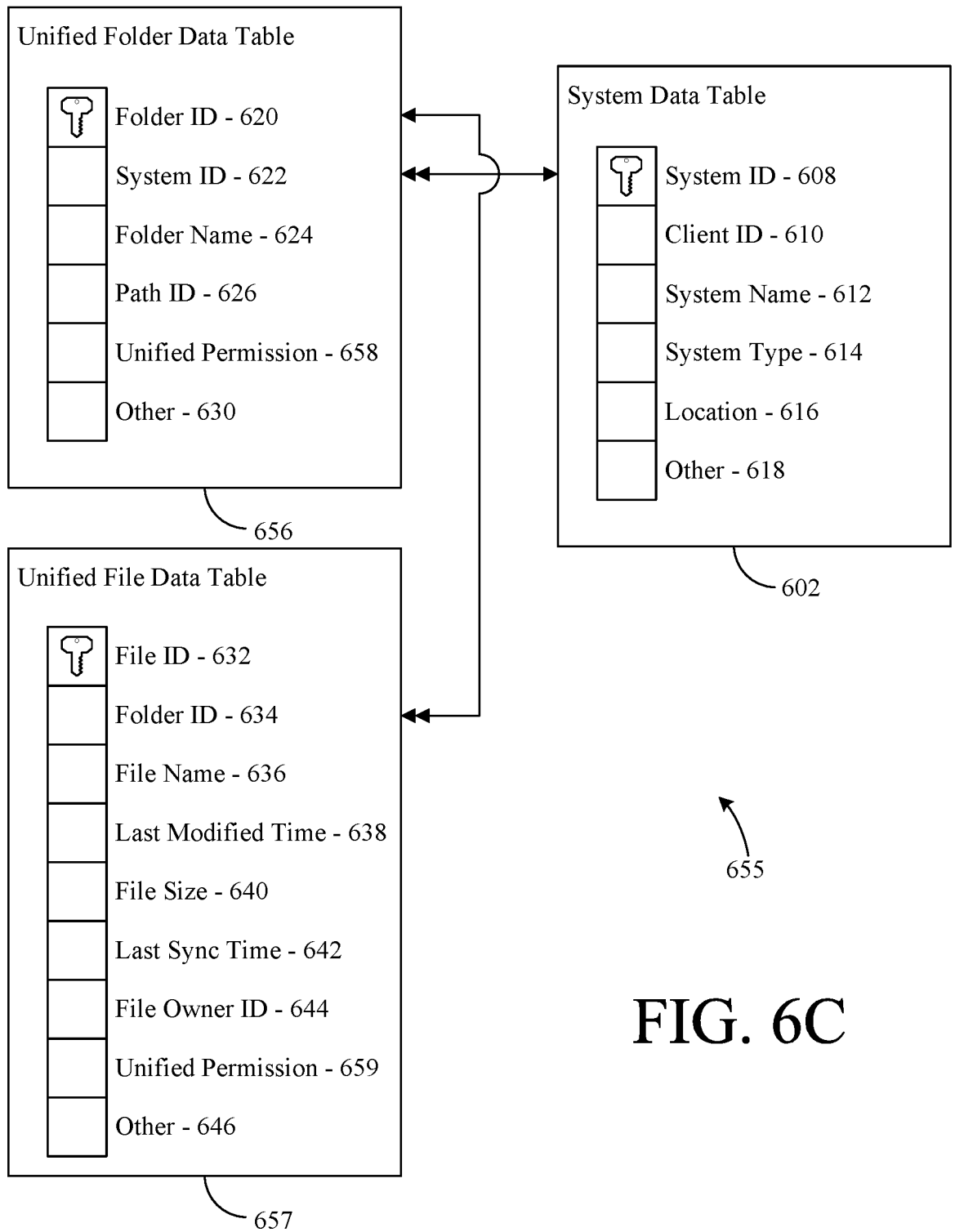
FIG. 6C shows an example data structure for associating data indicative of object-based, unified permissions utilized by the remote file storage system of FIG. 1.

Permissions resolver 406 contains mapping (FIG. 6B) between source-specific permissions and unified permissions (FIG. 6C). Permissions resolver 406 performs the conversion on the incoming datasets and provides the datasets to permissions consolidation service 408.

Figure 5C:
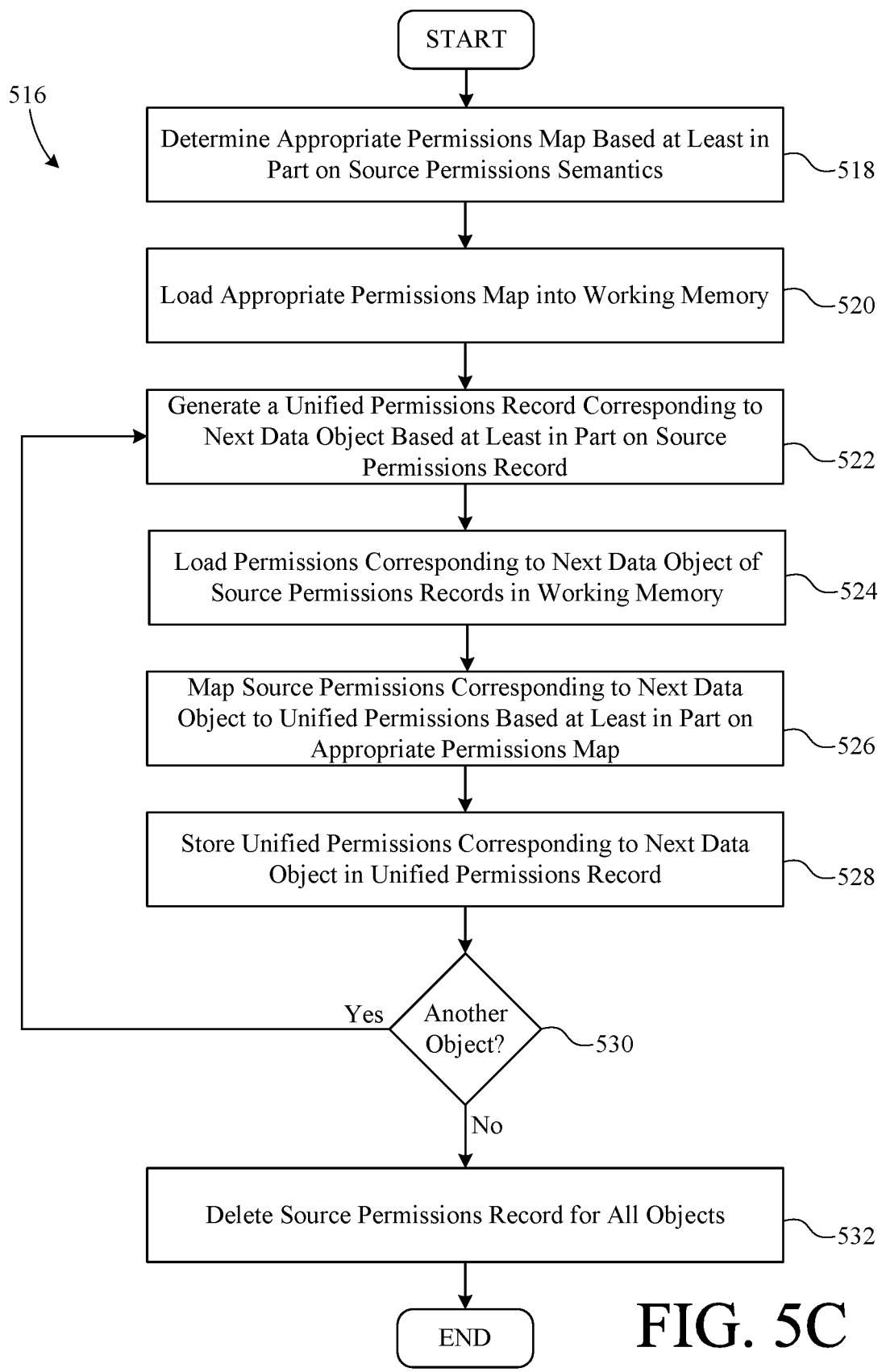
FIG. 5C is a flowchart summarizing an example method for converting source permissions to unified permissions.

FIG. 5C summarizes an example method 516 for converting the incoming datasets. In a first step 518, an appropriate permissions map is determined based at least in part on the source permissions semantics. Then, in a second step 520, the appropriate permissions map is loaded into working memory. Next, in a third step 522, a unified permissions record is generated corresponding to a next data object based at least in part on a corresponding source permissions record. Then, in a fourth step 524, permissions (from a corresponding source permissions record) corresponding to the next data object are loaded in working memory. Next, in a fifth step 526, the source permissions corresponding to the next data object are mapped to unified permissions based at least in part on the appropriate permissions map. Then, in a sixth step 528, the unified permissions corresponding to the next data object are stored in the unified permissions record. Next, at a decision block 530, it is determined whether or not there are additional objects identified by additional source permissions records. If there is an additional object, method 516 returns to step 522, which is repeated along with steps 524-528, for the additional object(s), until there are no more additional data objects. In this way, the source permissions for each object are mapped to unified permissions and stored in a record in association with the corresponding object. If, in decision block 530, it is determined that there are no more data objects, method 516 proceeds to a seventh step 532, and the source permissions are deleted for all the data objects. Then, method 516 ends. Optionally, the source permissions records can be archived and/or stored in storage devices 302, for example.

Figure 5D:
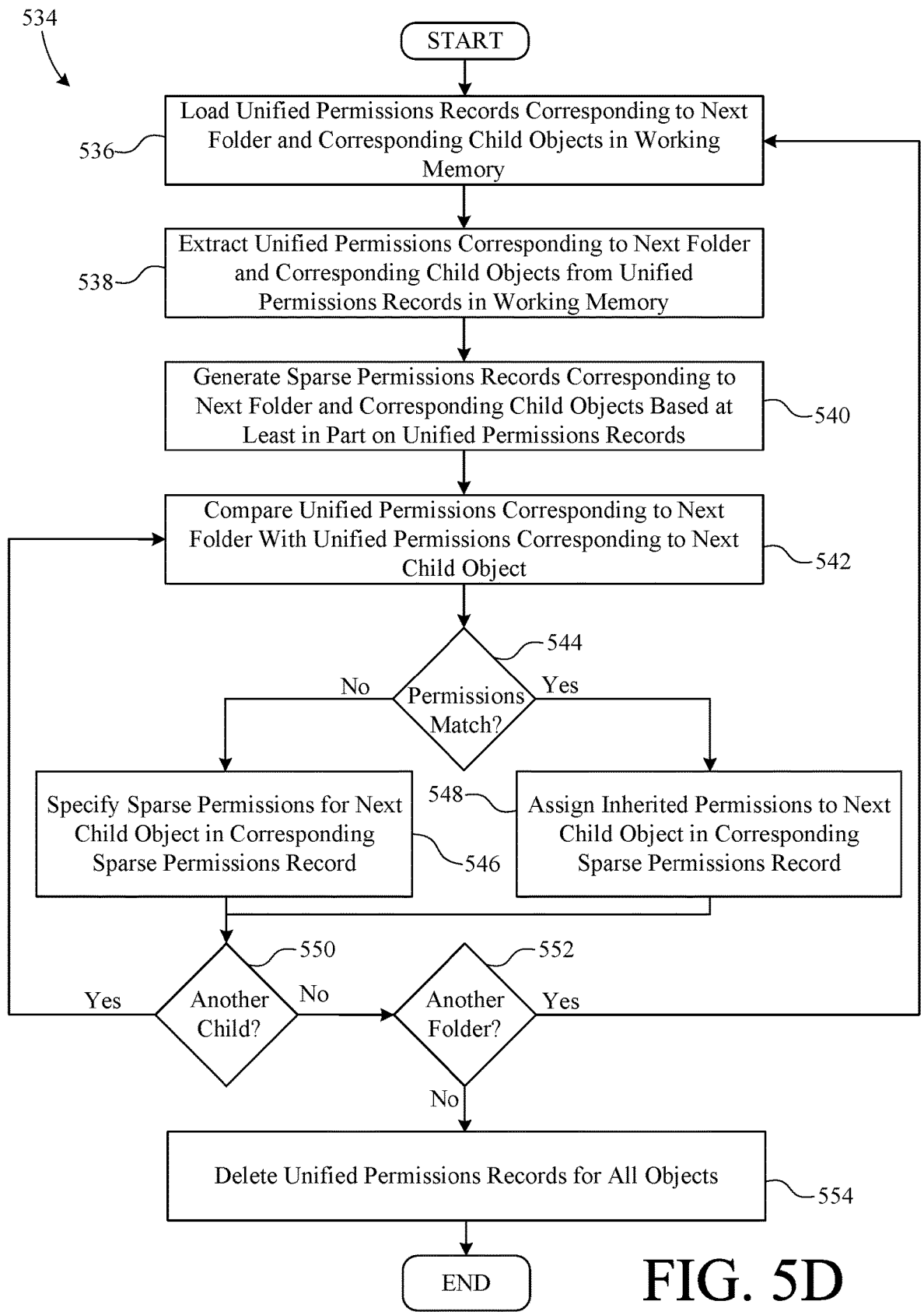
FIG. 5D is a flowchart summarizing an example method for reducing the unified permissions datasets to form inheritance-based, sparse datasets.
Figure 6D:
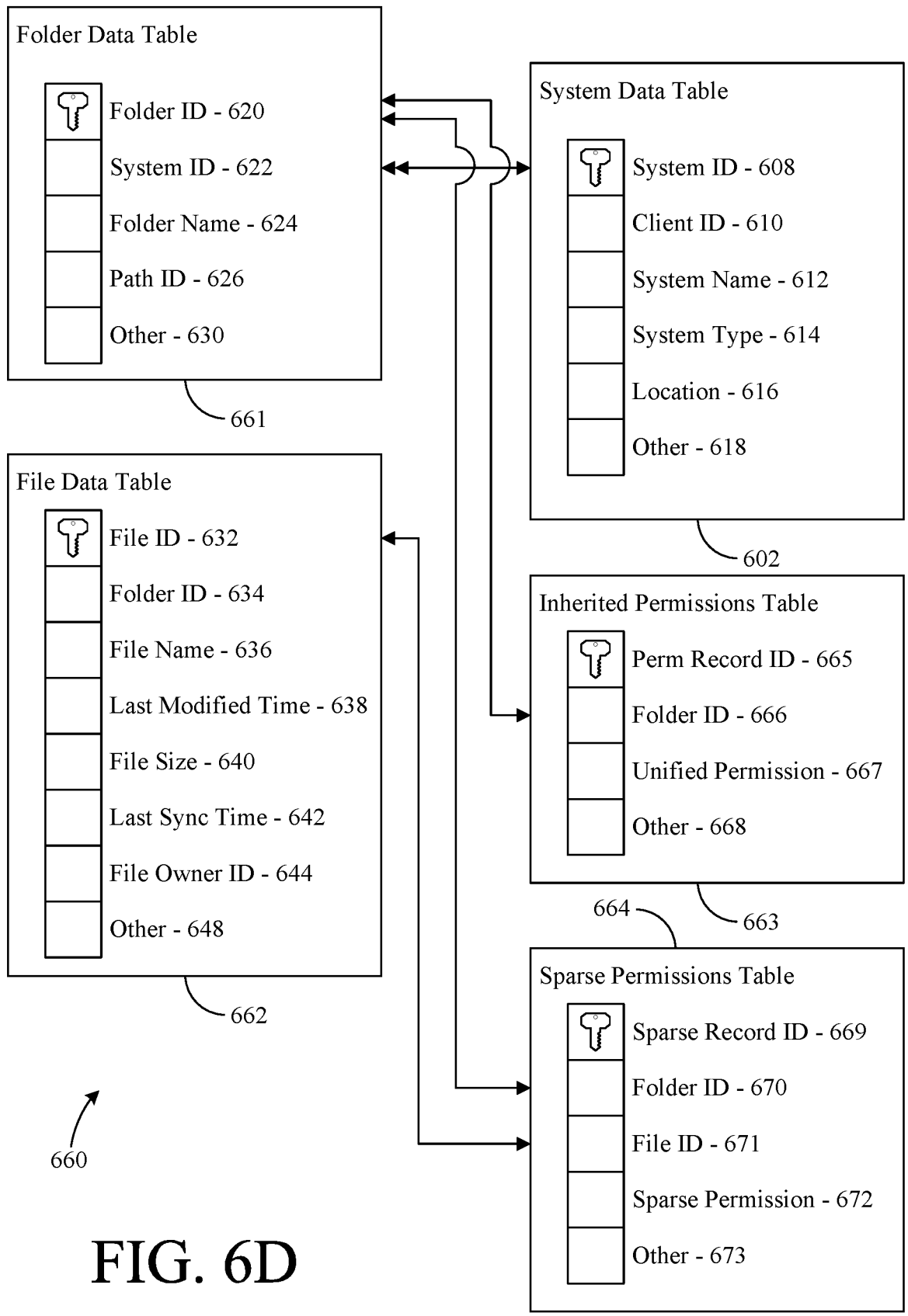
FIG. 6D shows an example data structure for associating data indicative of inheritance-based, sparse permissions utilized by the remote file storage system of FIG. 1.

FIG. 5D summarizes an example method 534, whereby permissions consolidation service 408 (FIG. 5A) performs a reduction on the unified permissions datasets to convert them to inheritance-based, sparse datasets (FIG. 6D). In a first step 536, unified permissions records corresponding to a next folder and corresponding child objects are loaded into working memory. Then, in a second step 538, the unified permissions corresponding to the next folder and the corresponding child objects are extracted from the unified permissions records in working memory. Next, in a third step 540, sparse permissions records corresponding to the next folder (if not previously created) and the corresponding child objects are created based at least in part on the unified permissions records. Then, in a fourth step 542, the unified permissions corresponding to the next folder are compared to the unified permissions corresponding to a next child object. Next, at a decision block 544, it is determined whether the permissions compared in step 542 match. If the permissions do not match, sparse permissions are specified for the next child object in a corresponding sparse permissions record in a fifth step 546. Then, method 534 continues to a decision block 550. If, at decision block 544, the permissions do match, the next child object is assigned inherited permissions in the corresponding sparse permissions record in a sixth step 548. Then, method 534 continues to decision block 550. At decision block 550 it is determined whether there is an additional child object corresponding to the next folder. If there is an additional child object, method 534 returns to step 542, which is repeated along with steps 544-548 for every child object corresponding to the next folder. If, at decision block 550, there is not an additional child object, method 534 proceeds to another decision block 552, where it is determined whether there is an additional folder containing at least one child object. If there is an additional folder containing a child object, method 534 returns to step 536, which is repeated along with steps 538-550 for every folder containing at least one child object. When there are no additional folders containing a child object, method 534 continues to a seventh step 554, where the unified permissions are deleted for all objects. Optionally, the unified permissions can be archived and/or stored in storage devices 302. At the conclusion of method 534, permissions consolidation service 408 provides the inheritance-based, sparse datasets to user-level permissions resolver 410.

Figure 5E:
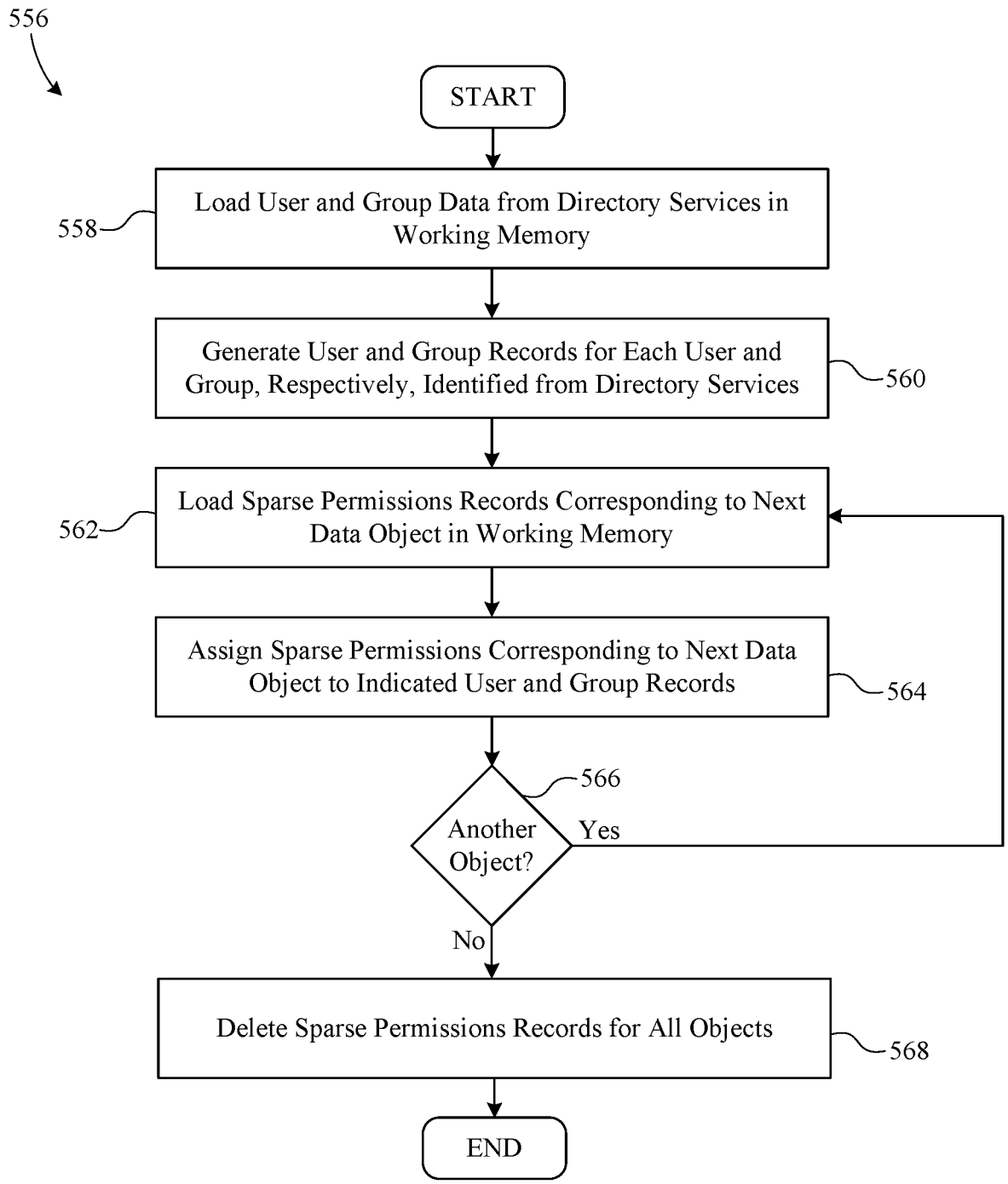
FIG. 5E is a flowchart summarizing an example method for converting system-level simplified permissions datasets to user-level permissions datasets.
Figure 6E:
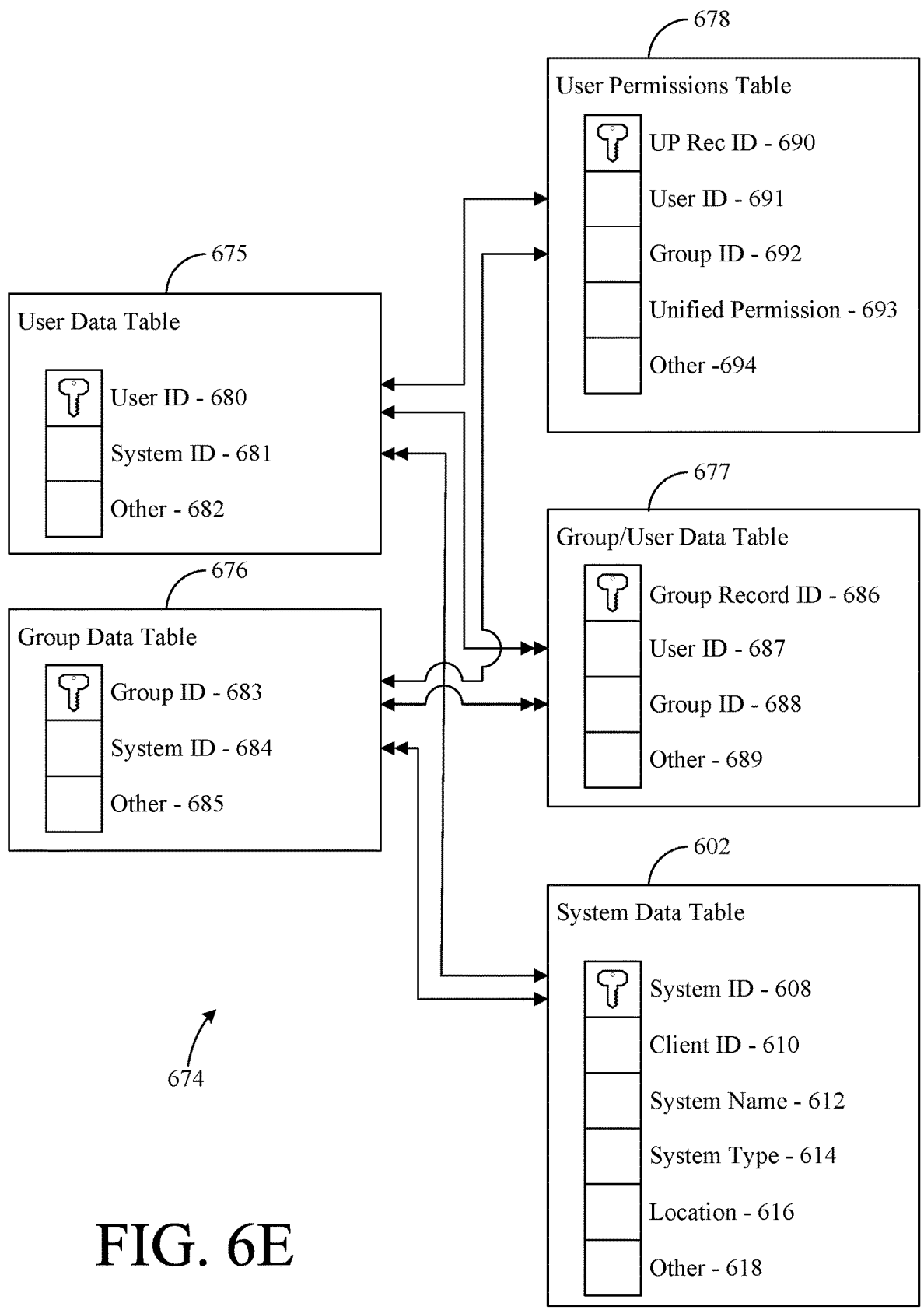
FIG. 6E shows an example data structure for associating data indicative of user-level, inheritance-based, sparse permissions stored in the permissions database of FIG. 3.

FIG. 5E summarizes an example method 556, whereby user-level permissions resolver 410 (FIG. 5A) converts the system-level simplified permissions datasets (utilizing data from directory service 412) to user-level permissions datasets (FIG. 6E). In a first step 558, user and group data from directory service 412 is loaded into working memory. Then, in a second step 560, user and group records are generated for each user and group, respectively, which is identified from directory service 412. Next, in a third step 562, a sparse permissions record corresponding to a next data object is loaded into working memory. Then, in a fourth step 564, sparse permissions corresponding to the next data object are assigned to associated user and group records. Next, at a decision block 566, it is determined whether there is another data object for which permissions have not yet been assigned to associated user and group records. If there is another data object for which permissions have not been assigned, method 556 returns to step 562, which is repeated along with step 564 for each data object until all permissions have been assigned to the associated users and groups. When there are no more data objects for which permissions have not been assigned, method 556 continues to step 568, where the sparse permissions records are deleted for all objects. Optionally, the sparse permissions can be archived and/or stored in storage devices 302. At the conclusion of method 556, user-level permissions resolver 410 stores the user-level permissions datasets in permissions database 132 (labeled "User-Level Simplified Permissions") for further reduction and simplified querying. The user-level, simplified permissions datasets feed into analyzers 414, 416, and 418 (along with events from events store 422) and enable them to perform cross-system analysis.

FIGS. 6A-6E illustrate example data structures of the permissions records created by the various elements of permissions service 316(1), as well as the permissions map utilized by permissions resolver 406.

FIG. 6A shows an example data structure 600 containing data indicative of object-based permissions from source file storage systems 104 and/or 106. Data structure 600 includes a system data table 602, a source folder data table 604, and a source file data table 606. Data structure 600 is representative of the object-based permissions datasets provided by source storage systems 104 and/or 106.

System data table 602 includes a system ID field 608, a client ID field 610, a system name field 612, a system type field 614, a location field 616, and an other field 618. A record is created in system data table for each of source storage systems 104 and 106, as well as additional source storage systems as they are added.

System ID field 608 is the key field of system data table 602 and contains data that uniquely identifies each of the source storage systems. Client ID field 610 contains data indicative of the cloud client that corresponds to the system identified by system ID field 608. System name field 612 contains data indicative of a name of the system. System type field 614 contains data indicative of a type (e.g., Egnyte Connect©, Windows Server©, etc.) of the system. Permissions resolver 410 can utilize system type field 614 to determine which mapping is required to create the unified permissions datasets. Location field 616 contains data indicative of a location of the system, such as a particular office building. Other field 618 represents one or more fields containing data indicative of any other information that might be important to system data table 602.

Source folder data table 604 includes a folder ID field 620, a system ID field 622, a folder name field 624, a path field 626, a source permission field 628, and an other field 630. A record is created in source folder data table 604 for each folder in cloud computing system 100.

Folder ID field 620 is the key field of source folder data table 604 and contains data that uniquely identifies a folder in cloud computing system 100. System ID field 622 contains data that uniquely identifies the source storage system (e.g. source storage system 104) corresponding to the folder identified by folder ID field 620. System ID field 622 is analogous to system ID field 608; identical data in system ID field 622 and system ID field 608 correspond to the same source storage system. Thus, system ID field 622 and system ID field 608 create a many-to-one relationship between source folder data table 604 and system data table 602, because each folder corresponds to a single system, but one system includes many folders. Folder name field 624 contains data indicative of a name of the folder. Path field 626 contains data indicative of a path of the folder. Path field 626 is important when converting the datasets into inheritance-based, sparse datasets, because path field 626 indicates from where the folder inherits permissions (e.g. the next higher folder in the hierarchy). Source permission field 628 contains data indicative of the source permissions assigned to the folder. Source permission field 628 contains permissions in the syntax of the source storage system and may define permissions for each user and/or group that the system identified by system ID field 622 has permissions data for. Other field 630 represents one or more fields containing data indicative of any other information that might be important to source folder data table 604.

Source file data table 606 includes a file ID field 632, a folder ID field 634, a file name field 636, a last modified time field 638, a file size field 640, a last sync time field 642, a file owner ID field 644, a source permission field 646, and an other field 648. A record is created in source file data table 606 for each file in cloud computing system 100.

File ID field 632 is the key field of source file data table 606 and contains data that uniquely identifies a particular file in cloud computing system 100. Folder ID field 634 contains data uniquely identifying the folder containing the file identified by file ID field 632. Folder ID field 634 and folder ID field 620 create a many-to-one relationship between source file data table 606 and source folder data table 604, because each file corresponds to only one folder, but each folder contains many files. File name field 636 contains data indicative of a name of the file. Last modified time field 638 contains data indicative of a date and time that the file was last modified. File size field 640 contains data indicative of a size (e.g. 1 Megabyte (MB)) of the file. Last sync time field 642 contains data indicative of a date and time that the file was last synchronized. File owner ID 644 contains data indicative of an owner (e.g. a creator) of the file. Source permission 646 contains data indicative of the source permissions assigned to the file. Source permission field 646 contains permissions in the syntax of the source storage system and may define permissions for users and/or groups having some kind of access to the file. Other field 648 represents one or more fields containing data indicative of any other information that might be important to source file data table 606.

The permissions identified by source permission field 628 correspond to the permissions that are stored on and utilized by source file storage system 104 when determining whether or not to allow a particular user access to a particular data object. An example of source permission field 628 and/or source permission field 646 is as follows:

user_1, rexmd; user_2, r-x--; user_3, -----; group_1, r----; . . .

where "user_1", "user_2", and "user_3" represent particular users of the source storage system corresponding to the folder/file, "group_1" represents a particular group (of users) of the source storage system, "r" indicates that the corresponding user can read the corresponding folder/file, "e" indicates that the corresponding user can edit the corresponding folder/file, "x" indicates that the corresponding user can execute the corresponding folder/file, "m" indicates that the corresponding user can move the corresponding folder/file, "d" indicates that the corresponding user can delete the corresponding file, and "-" indicates that the user does not have the corresponding permission (i.e., a "-" in the place of an "r" indicates that the user does not have the read permission for the corresponding folder/file). As illustrated by the above permissions, user_1 has full access to the file. User_2 can read and execute the file, and user_3 has no access to the file. Users that are assigned to group_1 can read the file.

In some systems (e.g., Unix-like systems), the permissions may not explicitly indicate all of the individual users implicated by the permissions. For example, a Unix permissions might be a three part code containing the permissions for the owner (i.e., creator) of the file, any group(s) assigned to the file, and other users (i.e., not the creator or member of an assigned group). For these types of permissions, it may be necessary to obtain additional data from the file metadata, the directory service, etc. to determine all of the permissions at the user-level.

FIG. 6B is a chart showing an example permissions map 650 between source permissions and unified permissions utilized by permissions resolver 406. Permissions map 650 corresponds to, for example, source file storage system 104 and relates a plurality of source permissions 652 (e.g. "READ", "EDIT", etc.), of source file storage system 104, with a plurality of unified permissions 654 (e.g. "READ", "WRITE", and "DELETE"). Permissions map 650 maps source permissions 652 onto the corresponding unified permissions 654 to convert sets of permissions from source file storage system 104 to sets of unified permissions having a predefined syntax. Permissions resolver 406 utilizes various permissions maps, including permissions map 650, to convert a plurality of different permission sets from different source systems into a unified set of permissions, having only "READ", "WRITE", and "DELETE" permissions.

It should be noted that source file storage systems and permissions maps do not necessarily have a one-to-one relationship. For example, source file storage system 104 can include multiple types of file system storage, each having distinct permissions. Each of these types of file system storage would require an individual permissions map, unless they happen to have identical syntax. As another example, source file storage systems 104 and 106 could have identical permissions syntax, in which case only one permissions map would be necessary for resolving permissions from both systems. Any given permissions map utilized by remote file storage system 102 can include any number, combination, or type of different permissions.

FIG. 6C shows an example data structure 655 containing information indicative of object-based, unified permissions utilized by remote file storage system 102. Data structure 655 is similar to data structure 600, except that source folder data table 604 and source file data table 606 are replaced by a unified folder data table 656 and a unified file data table 657, respectively. Unified folder data table 656 and unified file data table 657 are very similar to source folder data table 604 and source file data table 606, respectively, except that source permission field 628 and source permission field 646 are replaced by unified permission field 658 and unified permission field 659, respectively.

Unified permission field 658 contains data indicative of the unified permissions assigned to the folder identified by folder ID field 620. Likewise, unified permission field 659 contains data indicative of the unified permissions assigned to the file identified by file ID field 632. As an example, unified permission field 658 (or unified permission field 659) might contain the following data:

user_1, rwd; user_2, r--; user_3, ---; group_1, r--; . . .

where the data in unified permission field 658 is mapped from the data in source permission field 628 and consolidated to the unified permissions using permissions map 650. As a particular example, the permissions corresponding to "user_2" were mapped from "r-x--" to "r--", because the source "READ" and "EXECUTE" permissions both correspond to the unified "READ" permission. Particularly, "r-x-" was mapped to "r-r--" and consolidated to "r--". Although the "READ", "WRITE" and "DELETE" permissions do not represent the full functionality available to users of the source systems, most actions that can be taken by those users can distilled down to "READ", "WRITE" or "DELETE" actions from a data leak perspective. In other words, "READ", "WRITE", "DELETE" permissions can be distilled from any permissions that present a security risk. As a result of mapping between source permission fields 628 and 646 and unified permission fields 658 and 659 in every record, data structure 655 contains uniform permissions data for all files and folders in cloud computing system 100, despite those files and folders originating from various source systems having heterogeneous permissions data.

FIG. 6D shows an example data structure 660 containing data indicative of inheritance-based, sparse permissions utilized by remote file storage system 102. Data structure 660 includes system data table 602, a folder data table 661, a file data table 662, an inherited permissions table 663, and a sparse permissions table 664.

Folder data table 661 is similar to unified folder data table 656, except that folder data table 661 does not include unified permission field 658. Similarly, file data table 662 is similar to unified file data table 657, except that file data table 662 does not include unified permissions field 659. Instead, the unified, object-based permissions are converted into inheritance-based, sparse permissions data, which is stored in inherited permissions table 663 and sparse permissions table 664.

Inherited permissions table 663 includes a permission record ID field 665, a folder ID field 666, a unified permission field 667, and an other field 668. A record is created in inherited permissions table 663 for each permission set that is to be inherited by at least one folder or file in the directory tree.

Permission record ID field 665 is the key field of inherited permissions table 663 and contains data that uniquely identifies a record in inherited permissions table 663. Folder ID field 666 contains data uniquely identifying a particular folder. Folder ID field 666 and folder ID field 620 of folder data table 661 create a one-to-one relationship between inherited permissions table 663 and folder data table 661, because each folder can only have one set of assigned permissions. Unified permission field 667 contains data indicative of unified permissions to be assigned to the particular folder identified by folder ID field 666. The unified permissions assigned to the folder are inherited by all folders and files contained within the folder (and all folders and files contained within those folders and so on), except for those folders and/or files that are explicitly indicated in another record in inherited permissions table 663 or in sparse permissions table 664 to have permissions other than those assigned to a parent folder. For files or folders having conflicting inheritance data (e.g., multiple higher-level folders having inherited permissions assigned thereto), the file/folder will inherit the permissions that are assigned to the closest folder in the directory tree. Other field 668 represents one or more fields containing data indicative of any other information that might be important to inherited permissions table 663.

Sparse permissions table 664 includes a sparse record ID field 669, a folder ID field 670, a file ID field 671, a sparse permission field 672, and an other field 673. A record is created in sparse permissions table 664 for each folder or file that does not share the permissions of its parent or containing folder, respectively.

Sparse record ID field 669 is the key field of sparse permissions table 664 and contains data that uniquely identifies each record in sparse permissions table 664. Folder ID field 670 contains data identifying a particular folder. Folder ID field 670 and folder ID field 620 of folder data table 661 create a one-to-one relationship between sparse permissions table 664 and folder data table 661, because each folder can only have one set of permissions assigned to it. File ID field 671 contains data identifying a particular file. File ID field 671 and file ID field 632 of file data table 662 create a one-to-one relationship between sparse permissions table 664 and file data table 662, because each file can only have one set of permissions assigned to it. Only one of folder ID field 670 and file ID field 671 can have a value in sparse permissions table 664. The other must contain a null value. Sparse permission field 672 contains data indicative of unified permissions assigned to the folder or the file identified by folder ID field 670 or file ID field 671, respectively. The unified permissions identified by sparse permission field 672 are different from the permissions that the folder or file would have inherited, thus the need for the corresponding record in sparse permissions table 664. Other field 673 represents one or more fields containing data indicative of any other information that might be important to sparse permissions table 664.

The representation of permissions data in the form of inherited permissions table 663 and sparse permissions table 664 increases storage and computational efficiency of remote file storage system 102. Data structure 660 eliminates the need to repeatedly store permissions that are inherited throughout directory trees and only stores data that is necessary to represent any differences from the inherited permissions. Data structure 660 is generated by extracting the unified permissions from unified folder data table 656 and unified file data table 657 of data structure 655 and analyzing the unified permissions to determine which permissions should be assigned as inherited permissions and which permissions should be assigned as sparse permissions. The necessary records are then created in inherited permissions table 663 and sparse permissions table 664. The records in inherited permissions table 663 and sparse permissions table 664 are changed as necessary to accommodate changes to permissions and/or new files and folders being generated on source storage systems 104 and/or 106.

The determination of whether to assign inherited permissions or sparse permissions to a given file or folder is made based on the permissions of the parent directory. For example, if a first file shares the same permissions as its parent folder, and a second file in the same folder is assigned different permissions, the first file will be assigned inherited permissions, and the second file will be assigned sparse permissions. The sparse permissions will include only enough information to indicate exactly how the permissions of the second file differ from the permissions of the parent folder, which is enough data to fully describe the permissions. For example, the inherited permissions can be described in a three-digit binary format, where the position of a digit identifies the type of the permission that the digit corresponds to and the value (i.e., 1 or 0) of the digit identifies whether or not the corresponding permission is granted. Then, the sparse permissions can be described in a complementary three-digit binary format, where the position of the digit identifies the type of the permission (corresponding to an inherited permission) and the value determines whether or not the permission differs from the inherited permissions. For example, an inherited permission can be indicated by the binary code [111] (i.e., the user can read, write, and delete the data object), and a corresponding sparse permission can be indicated by the binary code [011] (i.e., the sparse permission differs from the inherited permission for the write and delete actions). Then, to determine the permissions for the object corresponding to the sparse permission, a bitwise XOR operation can be performed on the two binary codes, resulting in the binary code [100]. Thus, the sparse permission indicates that the object is read-only for the corresponding user.

FIG. 6E shows an example data structure for storing user-level, inheritance-based, sparse permissions in permissions database 132. The user-level permissions are stored as a data structure 674, which includes system data table 602, a user data table 675, a group data table 676, a group/user data table 677, and a user permissions table 678. The information in user data table 675, group data table 676, and group/user table 677 is generated from similar (if not identical) data available from directory service 412.

User data table 675 includes a user ID field 680, a system ID field 681, and an other field 682. A record is created in user data table 675 for each user of cloud computing system 100.

User ID field 680 is the key field of user data table 675 and contains data that uniquely identifies a particular user of cloud computing system 100. System ID field 681 contains data uniquely identifying a particular source system that is accessible by the user identified by user ID field 680. System ID field 681 and system ID field 608 of system data table 602 create a many-to-one relationship between user data table 675 and system data table 602, because each user belongs to only one system, but each system can have many users. Alternatively, system ID field 681 can be replaced by a client ID field, which indicates a cloud client that the user corresponds to. In such a case, two (or more) users that access different systems but correspond to a single individual (e.g. an employee of the cloud client) can be represented by a single record in user data table 675. Other field 682 represents one or more fields that contain data indicative of any other information, such as a password hash, that might be relevant to user data table 675.

Group data table 676 includes a group ID field 683, a system ID field 684, and an other field 685. A record is created in group data table 676 for each group of cloud computing system 100.

Group ID field 683 is the key field of group data table 676 and contains information uniquely identifying a particular group of cloud computing system 100. System ID field 684 contains data uniquely identifying a particular source system that is accessible by the group identified by group ID field 683. System ID field 684 and system ID field 608 of system data table 602 create a many-to-one relationship between group data table 676 and system data table 602, because each group belongs to only one system, but each system can have many groups. Alternatively, system ID field 684 can be replaced by a client ID field, which indicates a cloud client that the group corresponds to. In such a case, two (or more) groups that access different systems but correspond to a single group of individuals (e.g. the accounting department of the cloud client) can be represented by a single record in group data table 676. Other field 685 contains data indicative of any other information, such as a department, that might be relevant to group data table 676.

Group/user data table 677 includes a group record ID field 686, a user ID field 687, a group ID field 688, and an other field 689. A record is created in group/user data table 677 each time a particular user is assigned to a particular group.

Group record ID field 686 is the key field of group/user data table 677 and contains data that uniquely identifies each record in group/user data table 677. User ID field 687 contains data uniquely identifying a particular user of cloud computing system 100. Group ID field 688 contains data uniquely identifying a particular group of cloud computing system 100. Each record in group/user data table 677 assigns the user identified by user ID field 687 to the group identified by group ID field 688. User ID field 687 and group ID field 688 create many-to-one relationships between user data table 675 and group data table 676, respectively, because each user can belong to many groups, and each group contains many users. Other field 689 represents one or more fields containing data indicative of any other information that might be relevant to group/user data table 677.

User permissions table 678 includes a user permissions (UP) record (rec) ID field 690, a user ID field 691, a group ID field 692, a unified permission field 693, and an other field 694. A record is created in user permissions table 678 for each user or group that has assigned permissions corresponding to data objects stored on cloud computing system 100.

UP rec ID field 690 is the key field of user permissions table 678 and contains data that uniquely identifies each record in user permissions table 678. User ID field 691 contains data uniquely identifying a particular user. Group ID field 692 contains data uniquely identifying a particular group. Each record in user permissions table 678 can refer to a user or a group, but not both. Therefore, only one of user ID field 691 or group ID field 692 will contain useful data, while the other will contain a null value. User ID field 691 and group ID field 692 create one-to-one relationships between user permissions table 678 and user data table 675 and group data table 676, respectively, because each user or group can have only one inherited permission (including permissions for many objects) assigned to them. Unified permission field 693 contains data indicative of the permissions assigned to the user or group identified by user ID field 691 or group ID field 692, respectively. The permissions are generated by user-level permission resolver 410 from inherited permissions table 663 and sparse permissions table 664 of data structure 660. For each permission in unified permission field 693, user-level permission resolver 410 scans the permissions in data structure 660 for a particular user or group and generates a list of object-permission pairs as found in data structure 660. In other words, whereas unified permission field 667 of inherited permissions table 663 includes a list of user-assigned permissions in a table associated with a folder, unified permission field 693 includes a list of object-assigned permissions in a table associated with a user or a group. Other field 694 represents one or more fields containing data indicative of any other information that might be important to user permissions table 678.

Data structure 674 contains permissions data for every user and storage system in cloud computing system 102, in a structure that is query-able by user and allows analyzers 414, 416, and 418 to quickly compile permissions information corresponding to particular users, user groups, lists of users, and/or lists of groups. Paired with access to object access events, this capability allows analyzer 414, 416, and 418 to make important determinations from a data security perspective. For example, analyzers 414, 416, and 418 can find groups of similar users from an access/permissions perspective, detect if certain systems have more open permissions than others, detect if certain storage systems contain unreachable data, discover users in the organization that have access to large amounts of data and, thus, present a larger risk, perform user behavior analysis across systems, and distinguish between low risk users and high risk users to determine how often to re-compute permissions data for particular users (based on how risky the user is).

Figure 7:
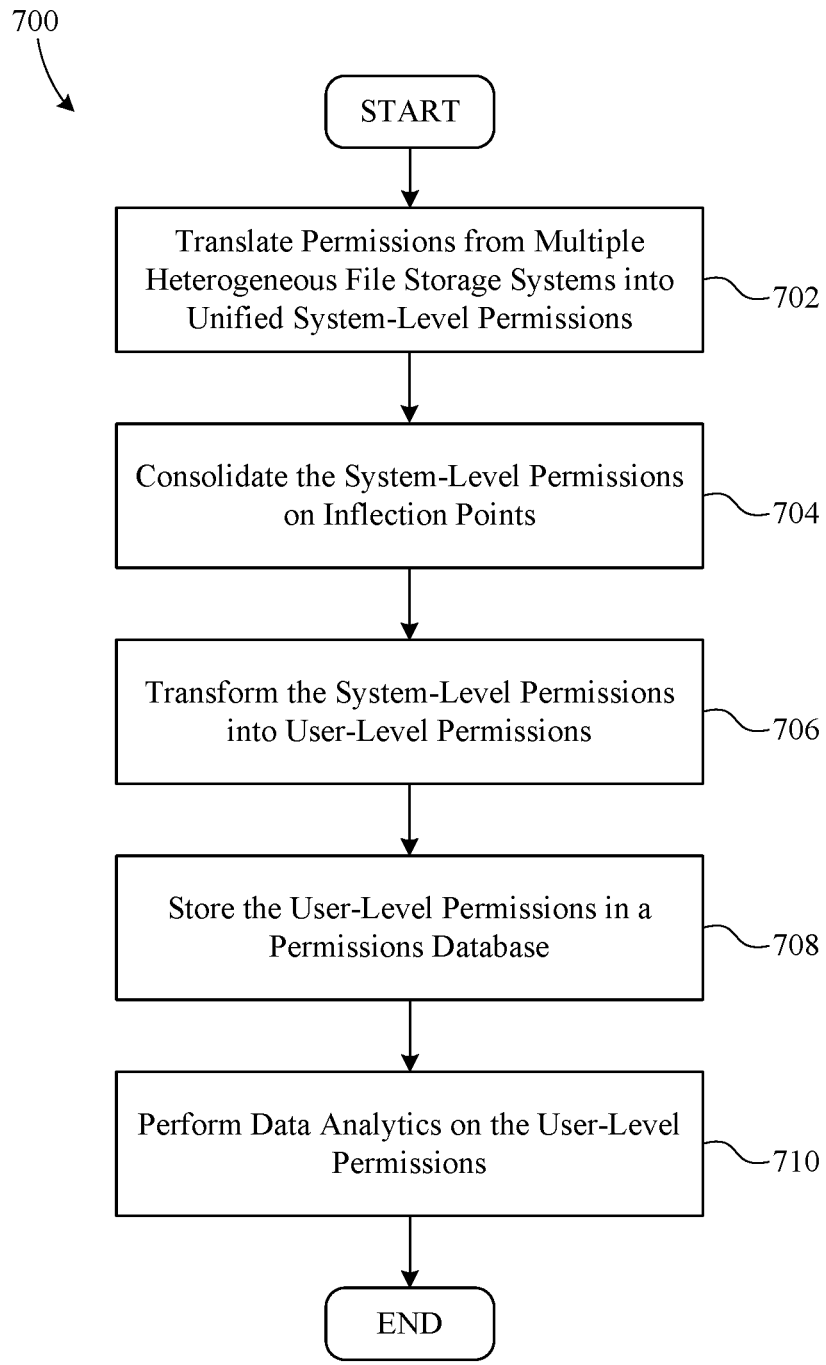
FIG. 7 is a flowchart summarizing an example method of processing and analyzing permissions data from multiple heterogeneous file storage systems.

FIG. 7 is a flowchart summarizing an example method 700 for processing and analyzing permissions data from multiple heterogeneous file storage systems. In a first step 702, permissions from multiple heterogeneous file storage systems are translated into unified system-level permissions. Next, in a second step 704, the system-level permissions are consolidated on inflection points. Then, in a third step 706, the system-level permissions are transformed into user-level permissions. Next, in a fourth step 708, the user-level permissions are stored in a permissions database. Finally, in a fifth step 710, data analytics are performed on the user-level permissions.

Figure 8A:
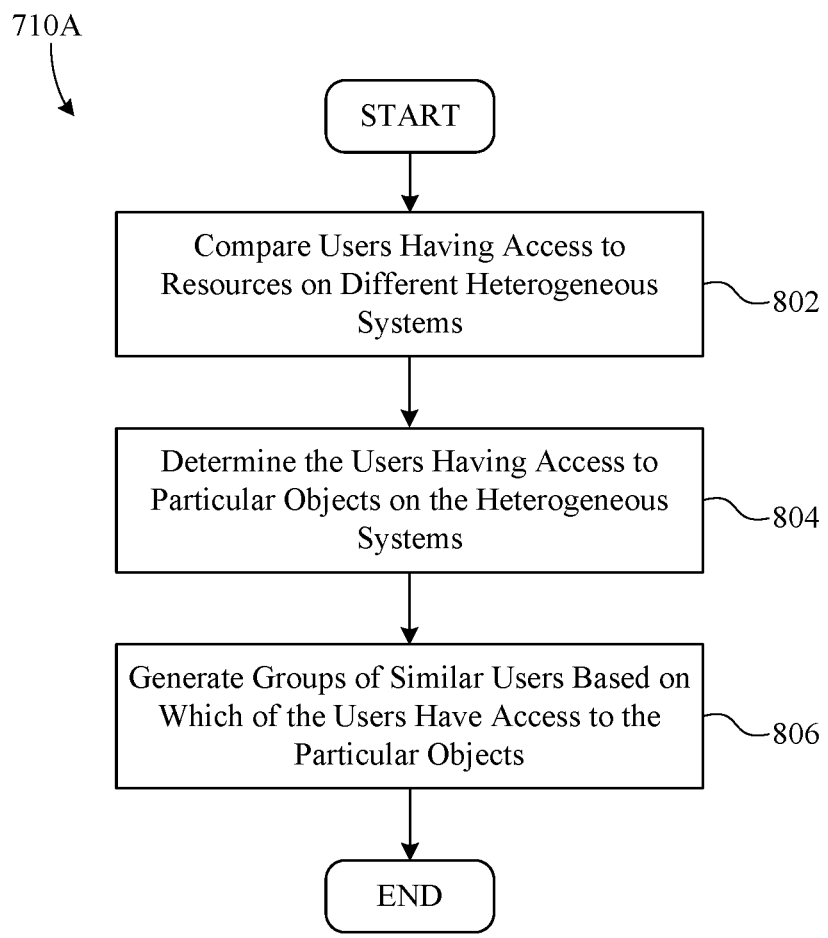
FIG. 8A is a flowchart summarizing an example method of performing a step of the method of FIG. 7.

FIG. 8A is a flowchart summarizing an example method 710A for performing step 710 of method 700. In a first step 802, users having access to resources on different heterogeneous systems are compared. Then, in a second step 804, the users having access to particular objects on the heterogeneous systems are determined. Finally, in a third step 806, groups of similar users are generated based on which of the users have access to the particular objects.

Figure 8B:
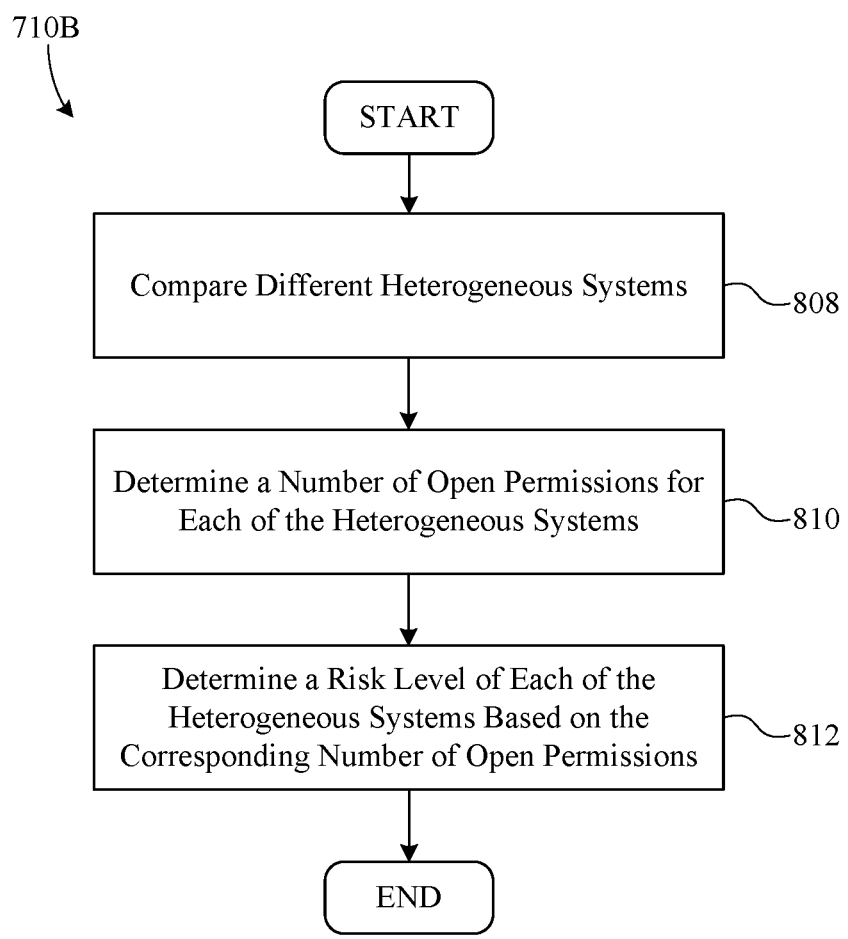
FIG. 8B is a flowchart summarizing another example method of performing a step of the method of FIG. 7.

FIG. 8B is a flowchart summarizing an example method 710B for performing step 710 of method 700. In a first step 808, different heterogeneous systems are compared. Then, in a second step 810, a number of open permissions is determined for each of the heterogeneous systems. Finally, in a third step 812, a risk level of each of the heterogeneous systems is determined based on the corresponding number of open permissions.

Figure 8C:
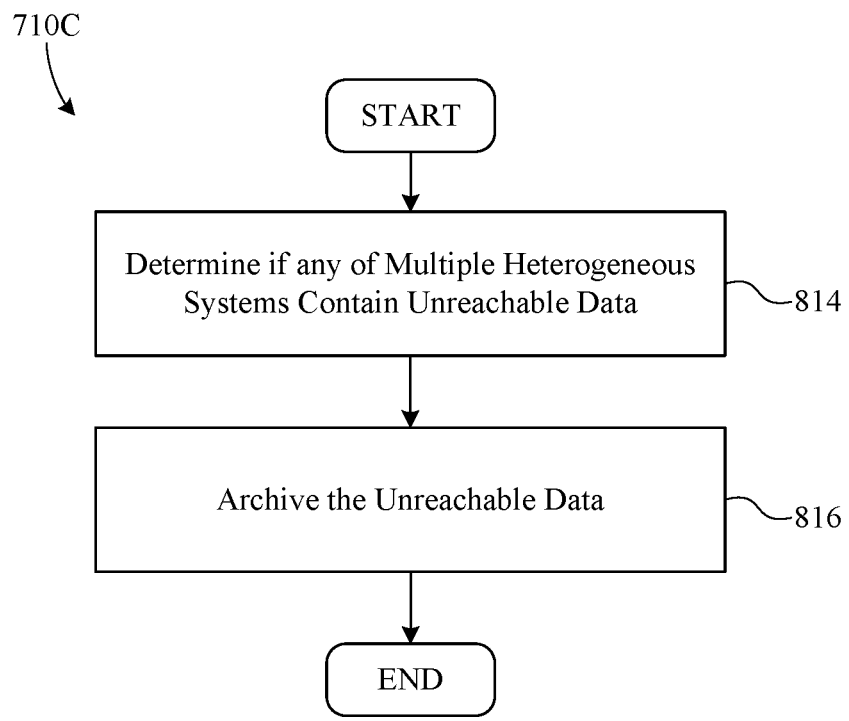
FIG. 8C is a flowchart summarizing yet another example method of performing a step of the method of FIG. 7.

FIG. 8C is a flowchart summarizing an example method 710C for performing step 710 of method 700. In a first step 814, it is determined if any of multiple heterogeneous systems contain unreachable data. Finally, in a second step 816, the unreachable data is archived.

Figure 8D:
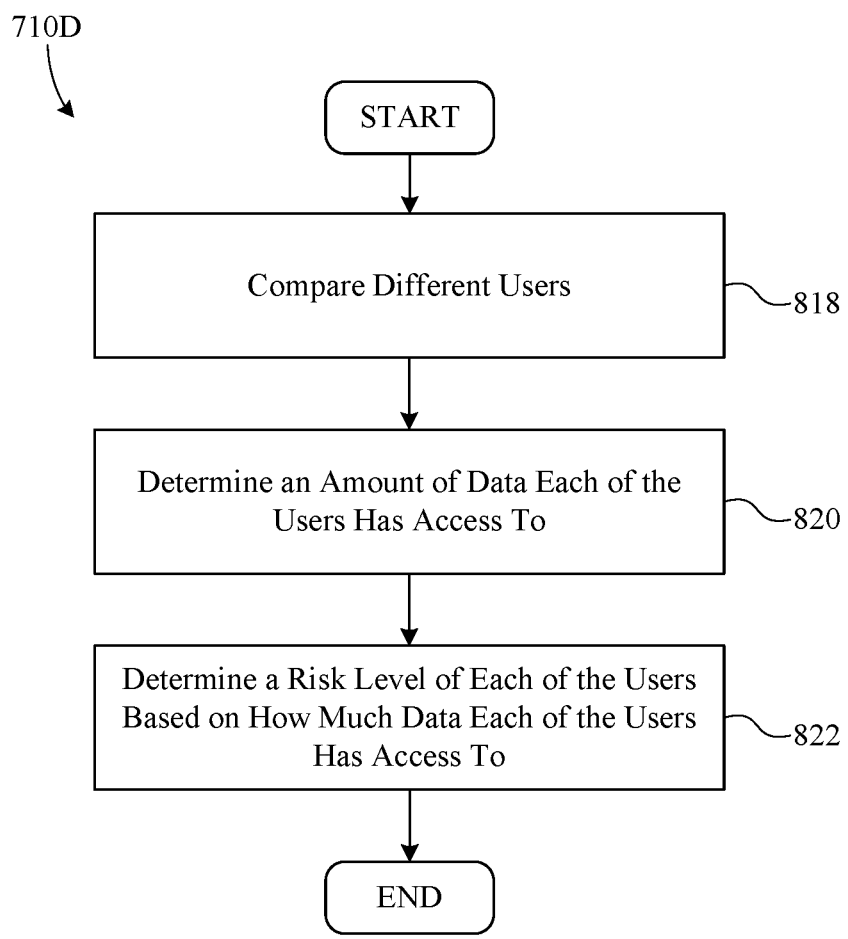
FIG. 8D is a flowchart summarizing another example method of performing a step of the method of FIG. 7.

FIG. 8D is a flowchart summarizing an example method 710D for performing step 710 of method 700. In a first step 818, different users are compared. Then, in a second step 820, an amount of data each of the users has access to is determined. Finally, in a third step 822, a risk level of each of the users is determined based on how much data each of the users has access to.

Figure 8E:
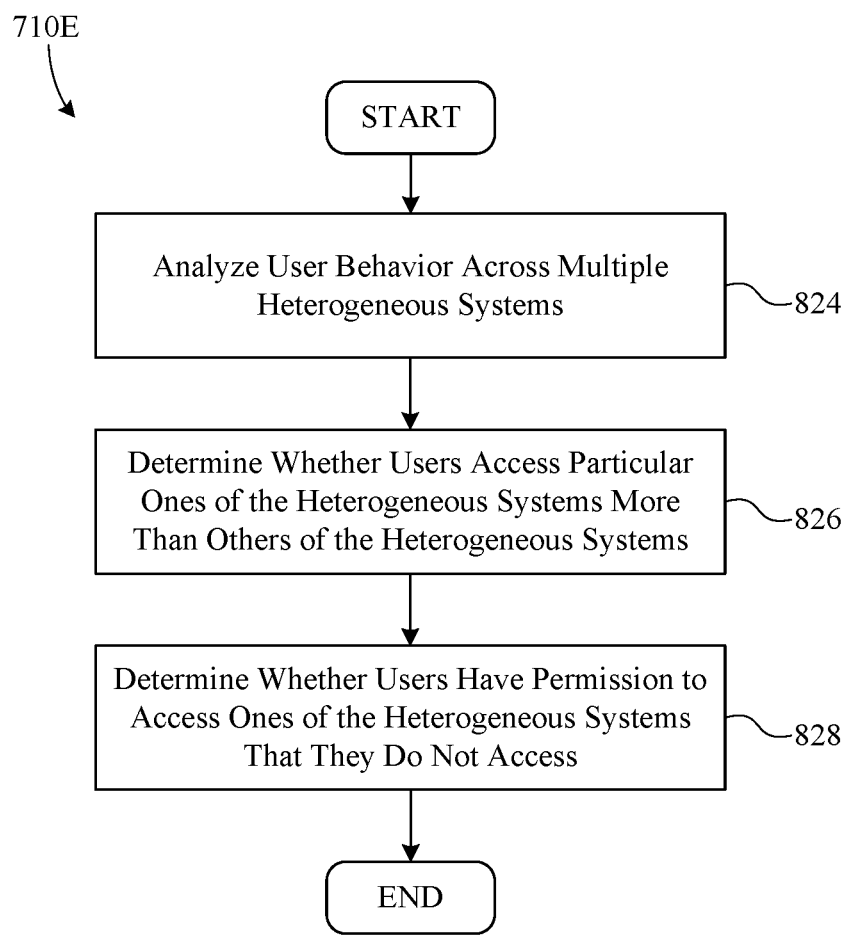
FIG. 8E is a flowchart summarizing yet another example method of performing a step of the method of FIG. 7.

FIG. 8E is a flowchart summarizing an example method 710E for performing step 710 of method 700. In a first step 824, user behavior is analyzed across multiple heterogeneous systems. Then, in a second step 826, it is determined whether users access particular ones of the heterogeneous systems more than others of the heterogeneous systems. Finally, in a third step 828, it is determined whether users have permission to access ones of the heterogeneous storage systems that they do not access. The users can, optionally, be given restricted to access to those of heterogeneous storage systems that they do not access.

Figure 8F:
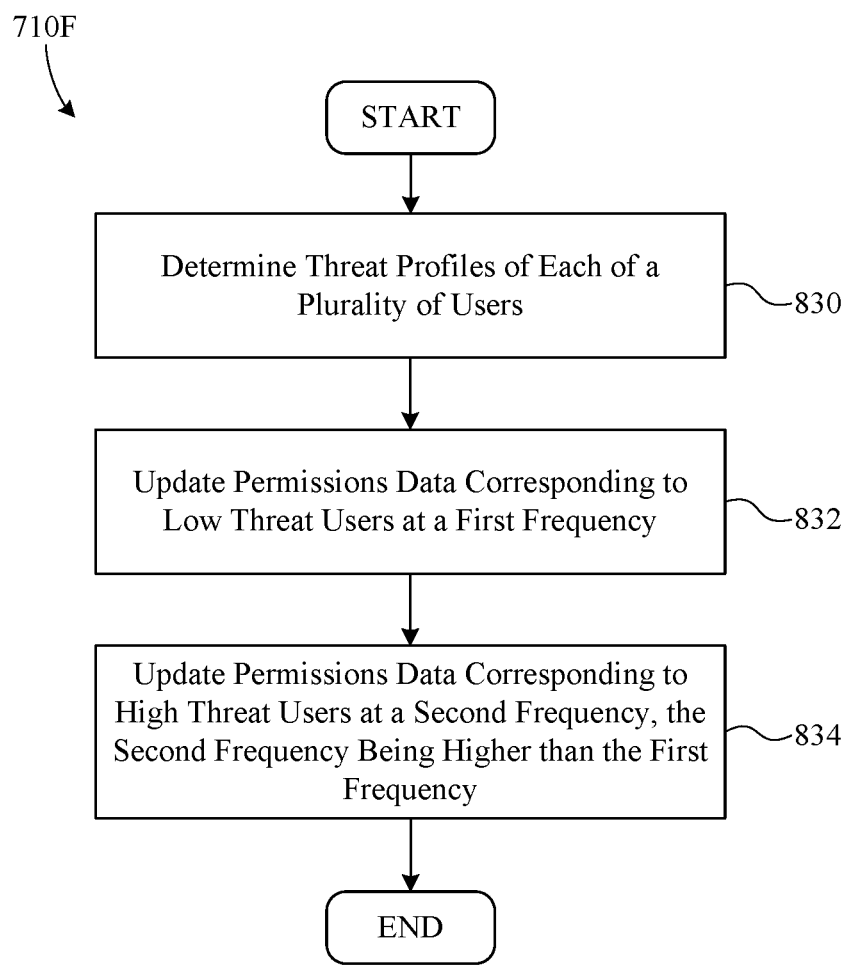
FIG. 8F is a flowchart summarizing another example method of performing a step of the method of FIG. 7.

FIG. 8F is a flowchart summarizing an example method 710F for performing step 710 of method 700. In a first step 830, threat profiles of each of a plurality of users are determined. Then, in a second step 832, permissions data corresponding to low threat users is updated at a first frequency. Finally, in a third step 834, permissions data corresponding to high threat users is updated at a second frequency. The second frequency is higher than the first frequency.

The description of particular embodiments of the present invention is now complete. Many of the described features may be substituted, altered or omitted without departing from the scope of the invention. For example, alternate permissions may be utilized in place of the permissions described with reference to FIGS. 6A, 6C, 6D, and/or 6E. As another example, alternate system architectures can be used. For example, the present invention could be utilized over a local area network (LAN) in an office building having multiple heterogeneous file storage systems. As yet another example, alternate data structures can be substituted for the example data structures used to provide a simplified explanation of the example embodiments. These and other deviations from the particular embodiments shown will be apparent to those skilled in the art, particularly in view of the foregoing disclosure.

We claim:

1. In a centralized file storage system, a method for performing data analytics, said method comprising:

establishing a first data connection with a first file storage system;

acquiring from said first file storage system a first set of file system permissions having a first set of permission semantics, said first set of file system permissions controlling access by a first user to data objects stored on said first file storage system, said first user being associated with said first file storage system;

establishing a second data connection with a second file storage system;

acquiring from said second file storage system a second set of file system permissions having a second set of permission semantics different from said first set of permission semantics, said second set of file system permissions controlling access by a second user to data objects stored on said second file storage system, said second user being associated with said second file storage system;

converting said first set of file system permissions to a first unified set of file system permissions having unified permission semantics different from said first set of permission semantics and said second set of permission semantics;

storing said first unified set of file system permissions in memory of said centralized file storage system;

converting said second set of file system permissions to a second unified set of file system permissions having said unified permission semantics;

storing said second unified set of file system permissions in memory of said centralized file storage system;

providing a data analytics tool configured to identify characteristics of a file system by analyzing corresponding permissions having said unified permission semantics;

analyzing said first unified set of file system permissions with said data analytics tool configured for use with said unified permission semantics;

analyzing said second unified set of file system permissions with said data analytics tool configured for use with said unified permission semantics;

altering said first set of file system permissions based on said step of analyzing said first unified set of file system permissions to create an altered first set of file system permissions; and causing a denial of access by said first user to a particular one of said data objects stored on said first file storage system, to which said first user had access prior to said step of altering, based on said altered first set of file system permissions.

2. The method of claim 1, wherein:
said step of analyzing said first unified set of file system permissions includes making a determination regarding a security level of said first file storage system; and
said step of analyzing said second unified set of file system permissions includes making a determination regarding a security level of said second file storage system.

3. The method of claim 2, wherein:
said step of converting said first set of file system permissions to said first unified set of file system permissions includes mapping said first set of file system permissions from said first set of permission semantics to said unified permission semantics; and
said step of converting said second set of file system permissions to said second unified set of file system permissions includes mapping said second set of file system permissions from said second set of permission semantics to said unified permission semantics.

4. The method of claim 3, wherein said step of converting said first set of file system permissions to said first unified set of file system permissions includes generating a first consolidated set of file system permissions by:
defining inherited permissions for at least a portion of said first unified set of file system permissions, said inherited permissions indicating that said first user is granted equivalent access to a plurality of data objects of said first file storage system without specifying said equivalent access with individual permissions corresponding to each data object of said plurality of data objects; and
specifying permissions for data objects of said portion of said first unified set of file system permissions only if said specified permissions differ from said inherited permissions.

5. The method of claim 4, wherein said step of converting said first set of file system permissions to said first unified set of file system permissions includes reorganizing said first consolidated set of file system permissions as user-level permissions.

6. The method of claim 5, wherein said step of reorganizing said first consolidated set of file system permissions as user-level permissions includes receiving directory data from a directory service associated with said first file storage system.

7. The method of claim 5, wherein said step of analyzing said first unified set of file system permissions includes:
determining if said first user and said second user have access to a particular subset of data objects stored on said first file storage system; and
generating a group including said first user and said second user if said first user and said second user have access to said particular subset of data objects.

8. The method of claim 5, wherein said step of analyzing said first unified set of file system permissions includes:
determining a number of said file system permissions of said first unified set of file system permissions corresponding to said first file storage system that allow users of said first file storage system to perform a corresponding action on a corresponding data object; and
determining a risk level of said first file storage system based at least in part on said number.

9. The method of claim 5, wherein said step of analyzing said first unified set of file system permissions includes:
identifying data objects of said first file storage system having no corresponding permissions that allow users of said first file storage system to perform a corresponding action on a corresponding one of said data objects; and
archiving identified data objects.

10. The method of claim 5, wherein said step of analyzing said first unified set of file system permissions includes:
determining a number of said unified permissions that allow said first user to perform a corresponding action on a corresponding data object; and
determining a risk level of said first user based at least in part on said number.

11. The method of claim 5, further comprising:
receiving data indicative of users accessing data objects of said first file storage system and said second file storage system;
determining that said first user does not access said second file storage system;
altering said second set of file system permissions to disallow said first user from performing actions on data objects of said second file storage system if said second set of file system permissions allows said first user to perform actions on data objects of said second file storage system.

12. The method of claim 5, further comprising:
receiving data indicative of users accessing data objects of said first file storage system and said second file storage system;

determining from said data a first number indicative of how often said users access data objects of said first file storage system;

determining from said data a second number indicative of how often said users access data objects of said second file storage system;

determining whether said users access said first file storage system more often than said second file storage system; and wherein said step of analyzing said first unified set of file system permissions includes determining a third number of said file system permissions of s aid first unified set of file system permissions corresponding to said first file storage system that allow users of said first file storage system to perform a corresponding action on a corresponding data object;

said step of analyzing said second unified set of file system permissions includes determining a fourth number of said file system permissions of said second unified set of file system permissions corresponding to said second file storage system that allow users of said second file storage system to perform a corresponding action on a corresponding data object; and said step of determining whether said users access said first file storage system more often than said second file storage system includes determining whether said first number divided by said third number is larger than said second number divided by said fourth number.

13. The method of claim 5, further comprising:

updating said first unified set of file system permissions periodically; and updating said second unified set of file system permissions periodically; and wherein said steps of analyzing said first unified set of file system permissions and analyzing said second unified set of file system permissions include determining that said first user has a first threat level based at least in part on a number of said unified permissions allowing said first user to perform an associated action on an associated data object of said first file storage system or said second file storage system;

said steps of analyzing said first unified set of file system permissions and analyzing said second unified set of file system permissions include determining that said second user has a second threat level based at least in part on a number of said unified permissions allowing said second user to perform an associated action on an associated data object of said first file storage system or said second file storage system, said second threat level indicating a greater threat than said first threat level;

said steps of updating said first unified set of file system permissions periodically and updating said second unified set of file system permissions periodically include updating permissions corresponding to said first user at a first frequency; and said steps of updating said first unified set of file system permissions periodically and updating said second unified set of file system permissions periodically include updating permissions corresponding to said second user at a second frequency, said second frequency being higher than said first frequency.

14. The method of claim 1, wherein:

said first data connection is a wide area network connection; and said second data connection is a wide area network connection.

15. The method of claim 1, wherein said first unified set of file system permissions includes only READ, WRITE, and DELETE permissions.

16. The method of claim 1, wherein said first unified set of file system permissions includes no more than three distinct permissions types.

17. The method of claim 1, further comprising:

synchronizing files stored in said centralized file storage system with files stored on said first file storage system using file system events received from said first file storage system;

synchronizing files stored on said centralized file storage system with files stored on said second file storage system using file system events received from said second file storage system; and using said file system events received from said first and second file storage systems in conjunction with said first unified set of file system permissions and said second unified set of file system permissions to evaluate the security of said first file storage system and said second file storage system.

18. The method of claim 17, further comprising communicating instructions that cause said first file storage system to modify said first set of file system permissions based on said evaluation of the security of said first file storage system and said second file storage system.

19. A data analytics system comprising:

one or more processing units;

memory storing data and code, said code including a set of predefined instructions that, when executed by said processing unit(s) cause said data analytics system to perform corresponding actions;

a data analytics tool configured to identify characteristics of a file system by analyzing corresponding permissions having unified permission semantics; and a communication interface; and wherein a first subset of said set of predefined instructions causes said data analytics system to establish a first connection with a first remote file storage system via said communication interface;

a second subset of said set of predefined instructions causes said data analytics system to acquire from said first remote file storage system a first set of file system permissions having a first set of permission semantics, said first set of file system permissions controlling access by a first user to data objects stored on said first remote file storage system, said first user being associated with said first remote file storage system;

a third subset of said set of predefined instructions causes said data analytics system to establish a second connection with a second remote file storage system via said communication interface;

a fourth subset of said set of predefined instructions causes said data analytics system to acquire from said second remote file storage system a second set of file system permissions having a second set of permission semantics different from said first set of permission semantics, said second set of file system permissions controlling access by a second user to data objects stored on said second remote file storage system, said second user being associated with said second remote file storage system;

a fifth subset of said set of predefined instructions causes said data analytics system to convert said first set of file system permissions to a first unified set of file system permissions having said unified permission semantics different from said first set of permission semantics and said second set of permission semantics;

a sixth subset of said set of predefined instructions causes said data analytics system to store said first unified set of file system permissions in said memory of said data analytics system;

a seventh subset of said set of predefined instructions causes said data analytics system to convert said second set of file system permissions to a second unified set of file system permissions having said unified permissions semantics;

an eighth subset of said set of predefined instructions causes said data analytics system to store said second unified set of file system permissions in said memory of said data analytics system;

a ninth subset of said set of predefined instructions causes said data analytics system to analyze said first unified set of file system permissions with said data analytics tool configured for use with said unified permissions semantics;

a tenth subset of said set of predefined instructions causes said data analytics system to analyze said second unified set of file system permissions with said data analytics tool configured for use with said unified permission semantics; and an eleventh subset of said set of predefined instructions causes said data analytics system to alter said first set of file system permissions based on said step of analyzing said first unified set of file system permissions to create an altered first set of file system permissions; and said altered first set of file system permissions causes a denial of access by said first user to a particular one of said data objects stored on said first file storage system, to which said first user had access prior to said step of altering.

20. The data analytics system of claim 19, wherein a twelfth subset of said set of predefined instructions causes said data analytics system to determine the security of said first remote file storage system and said second remote file storage system based on said analysis of said first unified set of file system permissions and said analysis of said second unified set of file system permissions.

* * * * *